US012754930B2

(12) United States Patent
Chen et al.

(10) Patent No.: US 12,754,930 B2
(45) Date of Patent: Oct. 6, 2026

(54) SYNCHRONIZATION OF DATA LAYERS IN CONTAINER IMAGES

(71) Applicant: International Business Machines Corporation, Armonk, NY (US)

(72) Inventors: Xiao Ling Chen, Changping District (CN); Jing Zhe Li, Beijing (CN); Yan Huang, Shijingshan District (CN); Xinpeng Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/037,890

(22) Filed: Jan. 27, 2025

(65) Prior Publication Data

US 2026/0220156 A1 Jul. 30, 2026

(51) Int. Cl.
*G06F 16/00* (2019.01)
*G06F 16/27* (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS 10,303,657 B2 5/2019 Huang et al.
10,496,494 B1 * 12/2019 Haloi .................... G06F 16/148
10,713,277 B2 7/2020 Auer et al.
11,182,140 B2 * 11/2021 Riek ......................... G06F 8/63
12,039,321 B2 7/2024 Sui et al.
2015/0127608 A1 * 5/2015 Hsieh .................. G06F 11/1464 707/623
2018/0088926 A1 3/2018 Abrams
2019/0243628 A1 * 8/2019 Goldmann ............ G06F 16/188
2020/0082094 A1 * 3/2020 Mcallister ................. G06F 8/77
2020/0110830 A1 * 4/2020 Chen ....................... G06F 16/27
(Continued)

FOREIGN PATENT DOCUMENTS

CN 117215714 A * 12/2023
WO 2019/165573 A1 9/2019

OTHER PUBLICATIONS

Authors et. al.: Disclosed Without Attribution, IP.com No. IPCOM000252398D, "System and Method of Patching Docker Hub Images", Jan. 8, 2018, 3 pages.
(Continued)

*Primary Examiner* — Alexander Khong
(74) *Attorney, Agent, or Firm* — CHIP LAW GROUP

(57) ABSTRACT

Synchronization of at least one source data layer of a source container image with a target container image includes receiving a command and detecting the at least one source data layer associated with the source container image in a source repository. A system determines source manifest information associated with the source container image based on the detection of the at least one source data layer in the source repository. The system generates a target manifest field associated with target manifest information of the target container image. The target manifest field includes one or more references to the at least one source data layer. The system synchronizes the at least one source data layer with the target container image based on the target manifest field.

20 Claims, 12 Drawing Sheets

(56) References Cited

U.S. PATENT DOCUMENTS

| | | | | |
|---|---|---|---|---|
| 2023/0125342 | A1* | 4/2023 | Krishna | G06F 16/192 707/639 |
| 2023/0266955 | A1* | 8/2023 | Li | G06F 9/45558 717/174 |
| 2023/0273741 | A1* | 8/2023 | Beedu | G06F 3/0604 711/154 |
| 2024/0126526 | A1* | 4/2024 | Malvankar | G06F 8/63 |
| 2025/0125947 | A1* | 4/2025 | Miller | H04L 9/0825 |

OTHER PUBLICATIONS

Zheng et al., "Wharf: Sharing Docker Images in a Distributed File System", SoCC '18: Proceedings of the ACM Symposium on Cloud Computing, Oct. 11, 2018, 12 pages.

* cited by examiner

SYNCHRONIZATION OF DATA LAYERS IN CONTAINER IMAGES

BACKGROUND

The disclosure relates to data synchronization and more particularly, to synchronization for data layers.

With the advancements in cloud computing, containerization technology has transformed the landscape of application development and application deployment by packaging applications along with the applications' components into a set of self-contained units known as container images. The container images are structured into multiple data layers, with each data layer representing multiple components, such as libraries, application code, and configuration files of the applications. This layered architecture enables efficient storage, and distribution, and updates the applications, allowing developers to manage the applications in a more modular and flexible manner. Efficient storage in containerization is achieved through the layered architecture, where each data layer represents distinct components of an application, allowing for shared layers across multiple containers and reducing redundancy. This modular approach minimizes the amount of data that needs to be stored and transferred during updates, optimizing resource usage. The ability to work with the container images is used in cloud computing and microservices architectures, where the applications often include multiple interconnected containers that operate cohesively. Furthermore, applications require timely updates, prompting users to upgrade to newer versions. When updating applications, users must upload or download the multiple data layers associated with the applications. As a result, the process of updating the applications is time-consuming, resource-intensive, and potentially error-prone, especially in scenarios where the applications are frequently updated or deployed across different environments.

SUMMARY

In various embodiments of the disclosure, a computer-implemented method for synchronizing at least one source data layer of a source container image with a target data layer of a target container image is described. The computer-implemented method includes receiving a command for the synchronizing of the at least one source data layer of the source container image with the target data layer of the target container image. The computer-implemented method further includes detecting the at least one source data layer associated with the source container image in a source repository. The at least one source data layer is detected based on the command. Further, the computer-implemented method includes determining source manifest information associated with the source container image based on the detection of the at least one source data layer in the source repository. The computer-implemented method further includes generating a target manifest field based on the source manifest information. The target manifest field is associated with target manifest information of the target container image. The target manifest field includes one or more references to the at least one source data layer. The computer-implemented method further includes synchronizing the at least one source data layer with the target data layer based on the target manifest field.

In various embodiments of the disclosure, a computer system for synchronizing at least one source data layer of a source container image with a target data layer of a target container image is described. The computer system includes a processor set, one or more computer-readable storage media, and program instructions stored on the one or more computer-readable storage media. The program instructions executable by the processor set to cause the processor set to receive the command to synchronize the at least one source data layer of the source container image with the target data layer of the target container image. The program instructions are executable by the processor set to cause the processor set to extract a set of keywords from the command. The set of keywords includes at least one of a name of the source container image, a name of the target container image, an address of a source repository of the source container image, a version of the target container image, and a version of the source container image. Further, the program instructions executable by the processor set to cause the processor set to detect the at least one source data layer associated with the source container image in the source repository. The at least one source data layer is detected based on the set of keywords. The program instructions executable by the processor set to cause the processor set to determine source manifest information associated with the source container image based on the detection of the at least one source data layer in the source repository. The program instructions executable by the processor set to cause the processor set to generate a target manifest field based on the source manifest information. The target manifest field is associated with target manifest information of the target container image. The target manifest field includes one or more references to the at least one source data layer. Further, the program instructions executable by the processor set to cause the processor set to synchronize the at least one source data layer with the target data layer based on the target manifest field.

In various embodiments of the disclosure, a computer program product for synchronizing at least one source data layer of a source container image with a target data layer of a target container image is described. The computer program product includes one or more computer-readable storage medium and program instructions stored on the one or more computer-readable storage media to perform operations. The operations include receiving a command for the synchronizing of the at least one source data layer of the source container image with the target data layer of the target container image. The operations further include detecting the at least one source data layer associated with the source container image in a source repository. The at least one source data layer is detected based on the command. Further, the operations include determining source manifest information associated with the source container image based on the detection of the at least one source data layer in the source repository. The operations further include generating a target manifest field based on the source manifest information. The target manifest field is associated with target manifest information of the target container image. The target manifest field includes one or more references to the at least one source data layer. The operations further include synchronizing the at least one source data layer with the target data layer based on the target manifest field.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
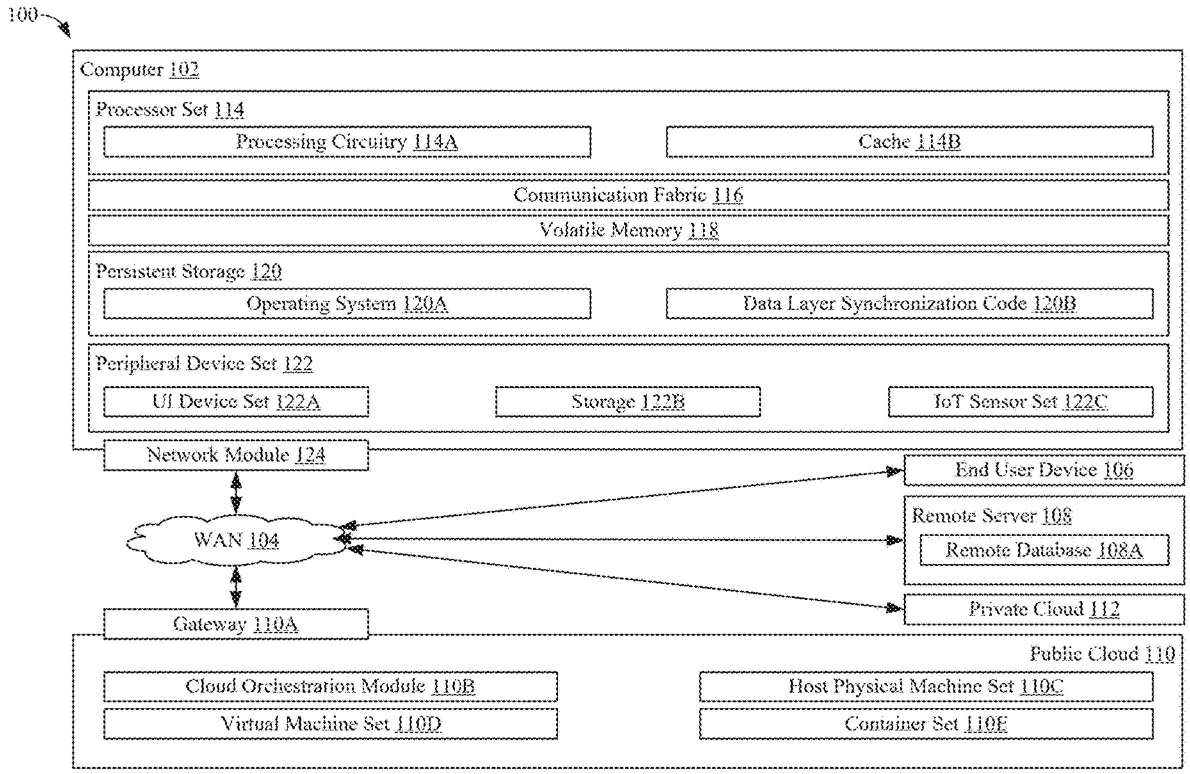
FIG. 1 is a diagram that illustrates a computing environment for the synchronization of data layers in container images, in accordance with an embodiment of the disclosure.

With the advancements in cloud computing, containerization technology has transformed the landscape of application development and application deployment. In the containerization technology, container images are used for running applications. A container image is a packaged file including a set of components used to run an application. For example, the set of components includes code, libraries, and dependencies associated with the application. When developers create the container image, the developers package the content of the container image into data layers and upload the data layers to a repository. When a user wants to use the container image, the user downloads the data layers including any data layers that existed before the creation of the container image. As a result, downloading the data layers may consume a lot of time, especially when security updates or new features are to be delivered quickly in the application.

For organizations, it's crucial to apply security fixes as soon as they are released to protect the application against vulnerabilities. However, when a new security patch is available for a known issue (known as Common Vulnerabilities and Exposures (CVEs)), the organizations apply the security fixes to multiple container images (for example, over 100 images). Currently, for updating or synchronizing the container images, the users upload or download the data layers resulting in inefficiency and time consumption. When a new CVE fix is released, the organizations must quickly implement the security patches across the multiple container images to prevent security risks. For example, the organizations are required to implement the security patches across the multiple container images within 24 hours. However, the lengthy process of packaging and delivering these security patches can lead to delays, increasing the risk of exposure to vulnerabilities. This challenge makes it hard for the organizations to respond quickly to security threats while managing different services. Further, traditional methods of packaging, testing, and delivering the security patches are slow, leaving computing systems vulnerable until the updates are made. To address these issues, there is a need for a faster and an efficient automated computing system to share the security patches across the multiple container images.

The proposed system manages security patches for the multiple container images by allowing source data layers (interchangeably called at least one source data layer) to be used across the multiple container images. The source data layers are components of a container image that can be reused across the multiple container images. By using a command, the proposed system obtains source layer content from the source data layers of container images stored in a repository. As a result, if a security patch is to be applied, the source data layers including the security patch can be used across different container images, allowing organizations to quickly apply high-priority CVE fixes. This approach is easy and efficient for both developers and users to adopt, as it does not require them to change their existing processes. Further, the seamless integration with the existing processes, reusable source data layers, and streamlined patch management capabilities saves time for the organizations making this approach easy and efficient for both developers and users. By reusing patched layers, the organizations can strengthen their production environments and reduce the time they are exposed to security vulnerabilities. The proposed system allows the organizations to handle container image updates through data layers, particularly for security patches. When a security vulnerability (like a CVE) needs to be addressed, instead of updating each container image individually, the proposed system enables the reuse of patched layers across multiple container images. This is accomplished through a simple command-based process that automatically synchronizes the security updates across different images. This approach significantly reduces the time and effort used to implement security updates, ensuring that the organizations can respond quickly to security threats while maintaining consistency across their container environment. The process is particularly effective because it maintains security without disrupting existing workflows or requiring complex changes to established procedures.

In various embodiments of the disclosure, a computer-implemented method for synchronizing at least one source data layer of a source container image with a target data layer of a target container image is described. The computer-implemented method includes receiving a command for the synchronizing of the at least one source data layer of the source container image with the target data layer of the target container image. The computer-implemented method further includes detecting the at least one source data layer associated with the source container image in a source repository. The at least one source data layer is detected based on the command. Further, the computer-implemented method includes determining source manifest information associated with the source container image based on the detection of the at least one source data layer in the source repository. The computer-implemented method further includes generating a target manifest field based on the source manifest information. The target manifest field is associated with target manifest information of the target container image. The target manifest field includes one or more references to the at least one source data layer. The computer-implemented method further includes synchronizing the at least one source data layer with the target data layer based on the target manifest field.

In various embodiments of the disclosure, the computer-implemented method further includes extracting, by the computer, a set of keywords from the command. The computer-implemented method further includes detecting, by the computer, the source container image in the source repository based on the set of keywords. The computer-implemented method further includes detecting, by the computer, the at least one source data layer in the source repository based on the set of keywords and the detection of the source container image.

In various embodiments of the disclosure, the set of keywords includes at least one of a name of the source container image, a name of the target container image, an address of the source repository, a version of the target container image, and a version of the source container image.

In various embodiments of the disclosure, the computer-implemented method includes detecting, by the computer, an availability of source layer content associated with the at least one source data layer in the source repository. The availability of the source layer content in the source repository is detected based on the source manifest information. Further, the computer-implemented method includes obtaining, by the computer, one or more source attributes associated with the at least one source data layer based on the source manifest information and the detection of the availability of the source layer content. The one or more source attributes correspond to metadata associated with the at least one source data layer of the source container image. The computer-implemented method further includes generating, by the computer, the target manifest field for the target data layer based on the one or more source attributes. Further, a set of target data layers of the target container image includes the target data layer. Further, the computer-implemented method includes storing, by the computer, the target manifest field in a target repository.

In various embodiments of the disclosure, the computer-implemented method includes obtaining, by the computer, the target manifest field from the target repository. Further, the computer-implemented method includes extracting, by the computer, the one or more source attributes from the obtained target manifest field. Further, the computer-implemented method includes obtaining, by the computer, the at least one source data layer from the source repository based on the extracted one or more source attributes. Furthermore, the computer-implemented method includes extracting, by the computer, the source layer content from the obtained at least one source data layer. Furthermore, the computer-implemented method includes integrating, by the computer, the extracted source layer content into the target data layer.

In various embodiments of the disclosure, the one or more source attributes include at least one of a digest of the at least one source data layer, a differential number of the at least one source data layer, a name of the at least one source data layer, and a version of the at least one source data layer.

In various embodiments of the disclosure, the target manifest information includes a configuration of each target data layer of the set of target data layers and one or more characteristics associated with each target data layer of the set of target data layers.

In various embodiments of the disclosure, the source manifest information includes a structure of the at least one source data layer and a set of characteristics of the at least one source data layer.

In various embodiments of the disclosure, a computer system for synchronizing at least one source data layer of a source container image with a target data layer of a target container image is described. The computer system includes a processor set, one or more computer-readable storage media, and program instructions stored on the one or more computer-readable storage media. The program instructions executable by the processor set to cause the processor set to receive the command to synchronize the at least one source data layer of the source container image with the target data layer of the target container image. The program instructions are executable by the processor set to cause the processor set to extract a set of keywords from the command. The set of keywords includes at least one of a name of the source container image, a name of the target container image, an address of a source repository of the source container image, a version of the target container image, or a version of the source container image. Further, the program instructions executable by the processor set to cause the processor set to detect the at least one source data layer associated with the source container image in the source repository. The at least one source data layer is detected based on the set of keywords. The program instructions executable by the processor set to cause the processor set to determine source manifest information associated with the source container image based on the detection of the at least one source data layer in the source repository. The program instructions executable by the processor set to cause the processor set to generate a target manifest field based on the source manifest information The target manifest field is associated with target manifest information of the target container image The target manifest field includes one or more references to the at least one source data layer. Further, the program instructions executable by the processor set to cause the processor set to synchronize the at least one source data layer with the target data layer based on the target manifest field.

In various embodiments of the disclosure, the program instructions executable by the processor set to cause the processor set to detect the source container image in the source repository based on the set of keywords. Further, the program instructions executable by the processor set to cause the processor set to detect the at least one source data layer in the source repository based on the set of keywords and the detection of the source container image.

In various embodiments of the disclosure, the program instructions executable by the processor set to cause the processor set to detect an availability of source layer content associated with the at least one source data layer in the source repository. The availability of the source layer content in the source repository is detected based on the source manifest information. The program instructions executable by the processor set to cause the processor set to obtain one or more source attributes associated with the at least one source data layer based on the source manifest information and the detection of the availability of the source layer content. The one or more source attributes correspond to metadata associated with the at least one source data layer of the source container image. Further, the program instructions executable by the processor set to cause the processor set to generate the target manifest field for the target data layer based on the one or more source attributes. A set of target data layers of the target container image includes the target data layer. The program instructions executable by the processor set to store the target manifest field in a target repository.

In various embodiments of the disclosure, the program instructions executable by the processor set to cause the processor set to obtain the target manifest field from the target repository. Further, the program instructions executable by the processor set to cause the processor set to extract the one or more source attributes from the obtained target manifest field. Furthermore, the program instructions executable by the processor set to cause the processor set to obtain the at least one source data layer from the source repository based on the extracted one or more source attributes. The program instructions executable by the processor set to cause the processor set to extract the source layer content from the obtained at least one source data layer. The program instructions executable by the processor set to cause the processor set to integrate the extracted source layer content into the target data layer.

In various embodiments of the disclosure, the one or more source attributes include at least one of a digest of the at least one source data layer, a differential number of the at least one source data layer, a name of the at least one source data layer, and a version of the at least one source data layer.

In various embodiments of the disclosure, the target manifest information includes a configuration of each target data layer of the set of target data layers and one or more characteristics associated with each target data layer of a set of target data layers.

In various embodiments of the disclosure, the source manifest information includes a structure of the at least one source data layer and a set of characteristics of the at least one source data layer.

In various embodiments of the disclosure, a computer program product for synchronizing at least one source data layer of a source container image with a target data layer of a target container image is described. The computer program product includes one or more computer-readable storage medium and program instructions stored on the one or more computer-readable storage media to perform operations. The operations include receiving a command for the synchronizing of the at least one source data layer of the source container image with the target data layer of the target container image. The operations further include detecting the at least one source data layer associated with the source container image in a source repository. The at least one source data layer is detected based on the command. Further, the operations include determining source manifest information associated with the source container image based on the detection of the at least one source data layer in the source repository. The operations further include generating a target manifest field based on the source manifest information. The target manifest field is associated with target manifest information of the target container image. The target manifest field includes one or more references to the at least one source data layer. The operations further include synchronizing the at least one source data layer with the target data layer based on the target manifest field.

In various embodiments of the disclosure, the program instructions stored on the one or more computer-readable storage media perform operations including extracting a set of keywords from the command. Further, the operations include detecting the source container image in the source repository based on the set of keywords. The operations further include detecting the at least one source data layer in the source repository based on the set of keywords and the detection of the source container image.

In various embodiments of the disclosure, the set of keywords includes at least one of a name of the source container image, a name of the target container image, an address of the source repository, a version of the target container image, or a version of the source container image.

In various embodiments of the disclosure, the program instructions stored on the one or more computer-readable storage media perform operations including detecting an availability of source layer content associated with the at least one source data layer in the source repository. The availability of the source layer content in the source repository is detected based on the source manifest information. Further, the operations include obtaining one or more source attributes associated with the at least one source data layer based on the source manifest information and the detection of the availability of the source layer content. The one or more source attributes correspond to metadata associated with the at least one source data layer of the source container image. The operations further include generating the target manifest field for the target data layer based on the one or more source attributes. A set of target data layers of the target container image includes the target data layer. The operations further include storing the target manifest field in a target repository.

In various embodiments of the disclosure, the program instructions stored on the one or more computer-readable storage media perform operations including obtaining the target manifest field from the target repository. Further, the operations include extracting the one or more source attributes from the obtained target manifest field. The operations further include obtaining the at least one source data layer from the source repository based on the extracted one or more source attributes. The operations further extracting the source layer content from the obtained at least one source data layer. Furthermore, the operations include integrating the extracted source layer content into the target data layer.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for synchronization of data layers in container images, in accordance with an embodiment of the disclosure. With reference to FIG. 1, there is shown a computing environment 100 that contains an example of an environment for the execution of at least some of the computer code involved in performing the disclosed methods, such as data layer synchronization code 120B. In addition to the data layer synchronization code 120B for synchronization of data layers in container images, computing environment 100 includes, for example, a computer 102, a wide area network (WAN) 104, an end-user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the data layer synchronization code 120B, as identified above), a peripheral device set 122 (including a user interface (UI) device set 122A, a storage 122B, and an Internet of Things (IOT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch, a robot, or various wearable computer, a mainframe computer, a quantum computer, or any form of a computer or a mobile device now known or to be developed in the future that is capable of running a program, accessing a network or querying a database, such as a remote database 108A. As is well understood in the art of computer technology, and depending upon the technology, the performance of a computer-implemented method is distributed among multiple computers and/or between multiple locations. Further, in this presentation of the computing environment 100, detailed discussion is focused on a single computer, specifically the computer 102, to keep the presentation as simple as possible. The computer 102 is located in a cloud, even though it is not shown in a cloud in FIG. 1. Further, computer 102 is not required to be in a cloud except to any extent as is affirmatively indicated.

The processor set 114 includes one, or more, computer processors of any type now known or to be developed in the future. The processing circuitry 114A is distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 is located "off-chip." In some computing environments, the processor set 114 is designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in several types of computer-readable storage media, such as the cache 114B and various storage media discussed below. The program instructions, and associated data, are accessed by the processor set 114 to control and direct the performance of the disclosed methods. In computing environment 100, at least some of the instructions for performing the disclosed methods are stored in the dynamic modification of the data layer synchronization code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Further, multiple types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 is distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the data layer synchronization code 120B typically includes at least some of the computer code involved in performing the disclosed methods.

The peripheral device set 122 includes the set of peripheral devices of computer 102. Data communication connections between the peripheral devices and the multiple components of computer 102 are implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage is provided by peripheral storage devices designed for storing very large amounts of data, such as a storage area network (SAN) that is shared by multiple, geographically distributed computers. The IoT sensor set 122C is made up of sensors that can be used in Internet of Things applications. For example, sensors may include a thermometer and motion detector.

The network module 124 is the collection of computer software, hardware, and firmware that allows computer 102 to communicate with multiple computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In some embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 is replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through the WAN 104 to EUD 106. In this way, the EUD 106 can display, or otherwise present recommendations to an end user. In some embodiments of the disclosure, EUD 106 is a client device, such as a thin client, heavy client, mainframe computer, desktop computer, and so on.

The remote server 108 is any computer system that serves at least some data and/or functionality to the computer 102. The remote server 108 is controlled and used by the same entity that operates the computer 102. The remote server 108 represents the machine(s) that collect and store helpful and useful data for use by multiple computers, such as the computer 102. For example, in a hypothetical case where the computer 102 is designed and programmed to provide a recommendation based on historical data, then this historical data is provided to the computer 102 from the remote database 108A of the remote server 108.

The public cloud 110 is any computer system available for use by multiple entities that provides on-demand availability of computer system resources and/or multiple computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs are stored as images and are transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through the WAN 104.

VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in some embodiments of the disclosure, a private cloud is disconnected from the internet entirely and only accessible through a local/private network. A hybrid cloud is a composition of multiple clouds of diverse types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
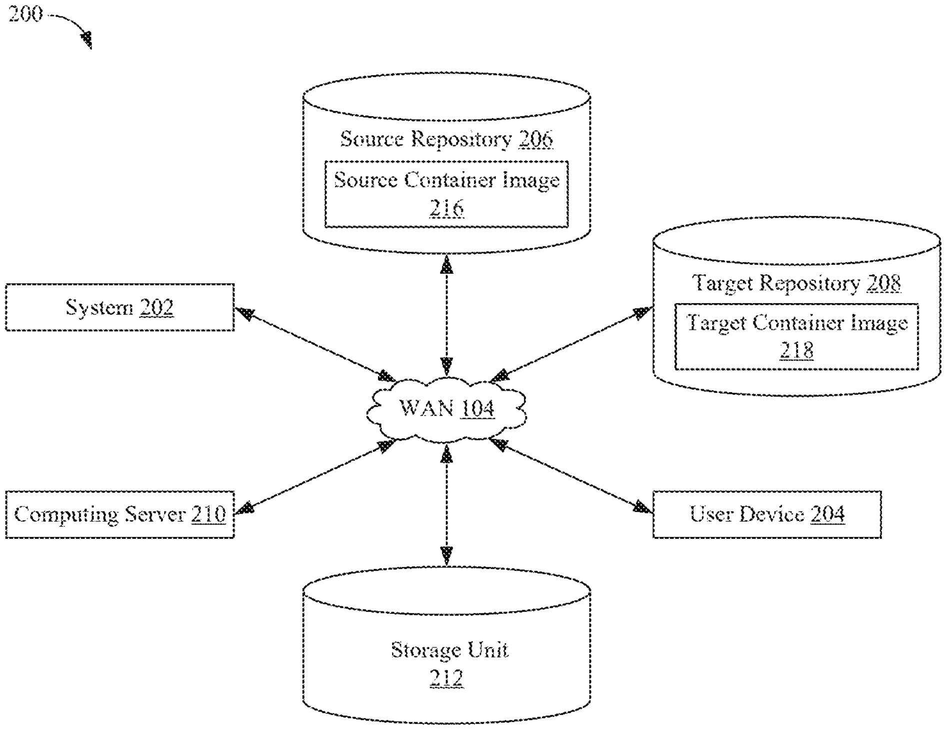
FIG. 2 is a diagram that illustrates a network environment for the synchronization of the data layers in the container images, in accordance with an embodiment of the disclosure.

FIG. 2 is a diagram that illustrates a network environment for the synchronization of the data layers in the container images, in accordance with an embodiment of the disclosure. FIG. 2 is explained in conjunction with elements from FIG. 1. With reference to FIG. 2, there is shown a diagram of the network environment 200. The network environment 200 includes a system 202, a user device 204, a source repository 206, a target repository 208, and a computing server 210. Further, the network environment 200 also includes a storage unit 212, such as an internal storage unit and an external storage unit. The network environment 200 further includes a WAN 104 of FIG. 1. In an embodiment of the disclosure, the system 202 is an exemplary embodiment of the computer 102 in FIG. 1.

The system 202 may include suitable logic, circuitry, interfaces, and/or code that is configured for the synchronization of the data layers in the container images. In an embodiment of the disclosure, the container images are packaged executable files including a set of components used to run an application. For example, the set of components may include an application code, a set of libraries, and a set of dependencies associated with the application. Further, the data layers correspond to individual components that are combined to form a container image. Further, each data layer represents a set of changes or additions, allowing for efficient storage, reuse, and management of the application's components.

The system 202 may include suitable logic, circuitry, interfaces, and/or code that is configured for the synchronization of the data layers in the container images. The system 202 is configured to receive a command for synchronizing at least one source data layer of a source container image 216 with a target data layer of a target container image 218. In an embodiment of the disclosure, the command may be received from the user device 204. In an embodiment of the disclosure, the source container image 216 is a container image stored in the source repository 206 that includes the at least one source data layer to be synchronized with the target data layer. In an embodiment of the disclosure, the target container image 218 is a container image stored in the target repository 208. Further, the target container image 218 corresponds to a container image that may receive source layer content associated with the at least one source data layer from the source container image 216. Further, the system 202 is configured to detect the at least one source data layer associated with the source container image 216 in the source repository 206. In an embodiment of the disclosure, the at least one source data layer is detected based on the command. Furthermore, the system 202 is configured to determine source manifest information associated with the source container image 216 based on the detection of the at least one source data layer in the source repository 206. The system 202 is configured to generate a target manifest field based on the source manifest information. The target manifest field is associated with target manifest information of the target container image 218. Further, the target manifest field includes one or more references to the at least one source data layer. The system 202 is further configured to synchronize the at least one source data layer with the target data layer based on the target manifest field. Details on synchronizing the at least one source data layer of the source container image 216 with the target data layer have been explained with reference to, for example, FIG. 5.

In an embodiment of the disclosure, each of the user device 204, the source repository 206, and the target repository 208 is connected independently to the system 202 using the WAN 104, such as 5G, 6G, and future wireless networks. This individual connectivity allows seamless and efficient data exchange between the system 202 and each of the user device 204, the source repository 206, and the target repository 208, allowing for real-time communication and the timely updating of data. By leveraging advanced wireless technologies such as 5G, 6G, and future networks, the system 202 can accommodate data throughput and minimal latency, ensuring that data synchronization processes are executed without delay and reliability. This enables the system 202 to handle large volumes of data packets efficiently, supports concurrent connections from multiple endpoints, and maintains data integrity during transmission, thereby optimizing the performance of distributed applications and enhancing the overall responsiveness of an architecture of the system 202.

Further, the user device 204 includes suitable logic, circuitry, interfaces, and/or code configured to input and transmit the command to the system 202, for the synchronization of the data layers in the container images. In an embodiment of the disclosure, the user device 204 is associated with a user. The user uses the user device 204 to input and transmit the command to the system 202. For example, the user may be a system administrator, a software developer, a cloud service provider, a cybersecurity professional, and the like. Further, the user device 204 ensures efficient communication with the system 202 through connectivity technologies like WAN, thereby supporting timely and secure data exchange. The user device 204 is communicatively coupled with the system 202 via the WAN 104. In an embodiment of the disclosure, the user device 204 is an exemplary embodiment of the EUD 106. Examples of the user device 204 may include, but are not limited to, a computing device, a smartphone, a mainframe machine, a server, a computer workstation, a cellular phone, a mobile phone, a gaming device, a consumer electronic (CE) device, a desktop computer, a laptop, a head-mounted device (HMD), and/or any electronic device. In an embodiment of the disclosure, the system 202 is implemented in the computing server 210. In an embodiment of the disclosure, the system 202 is implemented in the user device 204.

In an embodiment of the disclosure, a display screen of the user device 204 may include suitable logic, circuitry, and interfaces configured to receive the command. Further, the display screen provides a user-friendly interface where a user may input the command for the synchronization of the data layers in the container images. In an embodiment of the disclosure, the display screen may refer to a display screen of the smartphone, a display screen of the laptop, a display screen of the desktop computer, a display screen of a smart-glass device, a see-through display, a projection-based display, an electro-chromic display, or a transparent display. In an embodiment of the disclosure, the display screen is realized through several known technologies such as, but are not limited to, a Liquid Crystal Display (LCD) display, a Light Emitting Diode (LED) display, a plasma display, or an Organic LED (OLED) display technology, or multiple display devices.

In an embodiment of the disclosure, the computing server 210 is implemented as a cloud server and may execute operations through web applications, cloud applications, HTTP requests, repository operations, file transfer, and the like. Further, exemplary implementations of the computing server 210 include, but are not limited to, a database server, a file server, a web server, a media server, an application server, a mainframe server, or a cloud computing server.

In an embodiment of the disclosure, the computing server 210 is implemented as a plurality of distributed cloud-based resources by use of several technologies that are well known to those ordinarily skilled in the art. A person with ordinary skill in the art will understand that the scope of the disclosure may not be limited to the implementation of the computing server 210 and the system 202 as two separate entities. In certain embodiments, the functionalities of the computing server 210 can be incorporated in its entirety or at least partially in the system 202, without a departure from the scope of the disclosure.

In an embodiment of the disclosure, the storage unit 212 is configured to store an organized collection of data. The organized collection of data can be accessed electronically from a computer system (such as the system 202). In an embodiment of the disclosure, the storage unit 212 may be the internal storage unit communicatively coupled to the user device 204. The storage unit 212 is configured to store various types of data related to the synchronization process. The storage unit 212 securely stores the command, including a set of keywords associated with the command. Additionally, the storage unit 212 stores one or more source attributes. Details on the one or more source attributes have been explained with reference to, for example, FIG. 5.

Further, the storage unit 212 may be the external storage unit communicatively coupled to the system 202 via the WAN 104. In an embodiment of the disclosure, the storage unit 212 stores data generated by the synchronization processes. The storage unit 212 enhances the capacity of the system 202 to archive the command and the one or more source attributes. By leveraging the storage unit 212, the system 202 may be able to manage larger volumes of data effectively. Further, the storage unit 212 is designed to manage, store, retrieve, and update data efficiently. The structure of the storage unit 212 typically involves tables, records, and fields that can be managed through various database management systems (DBMS). Examples of the storage unit 212 may include, but are not limited to, a relational database, a Non-Structured Query Language (SQL) database, a hierarchical database, a network database, a transactional database, a data warehouse, a distributed database, and a data lake.

In operation, the system 202 is configured to receive the command for synchronizing the at least one source data layer of the source container image 216 with the target data layer. For example, the user may input the command, such as "sync data layer 'A' from source image 'X' to data layer 'A' of a target image 'Y'". Upon receiving the command, the system 202 is configured to detect the at least one source data layer associated with the source container image 216 in the source repository 206. For example, if the command specifies "the data layer 'A'," the system 202 queries the source repository 206 and locates the data layer 'A' within the source repository 206, confirming its existence and readiness for synchronization. Further, the system 202 is configured to determine the source manifest information associated with the source container image 216 based on the detected source data layer. The determination of the source manifest information includes extracting relevant details, such as version numbers of the source container image 216, dependencies of the source container image 216, and configuration settings of the source container image 216 from the manifest file of source image 'X'. For example, the system 202 may identify that data layer A has a version '1.0' and is dependent on data layer 'B'. Further, the system 202 is configured to generate a target manifest field based on the source manifest information. The target manifest field is associated with the target manifest information of the target container image 218. For example, the system 202 may create a field that specifies "data layer 'A' version 1.0" along with references to any dependencies, such as "data layer 'B'" that is required for successful synchronization of the at least one source data layer. The system 202 is further configured to synchronize the at least one source data layer with the target data layer based on the target manifest field. For example, the system 202 updates the target image 'Y' to include the data layer 'A' with the specified version and dependencies. For example, the system 202 may execute a command to obtain data layer 'A' from the source repository 206 and integrate it into the target repository 208, ensuring that the target image 'Y' is equipped with the latest data layer 'A' and is functioning correctly with its dependencies.

Figure 3:
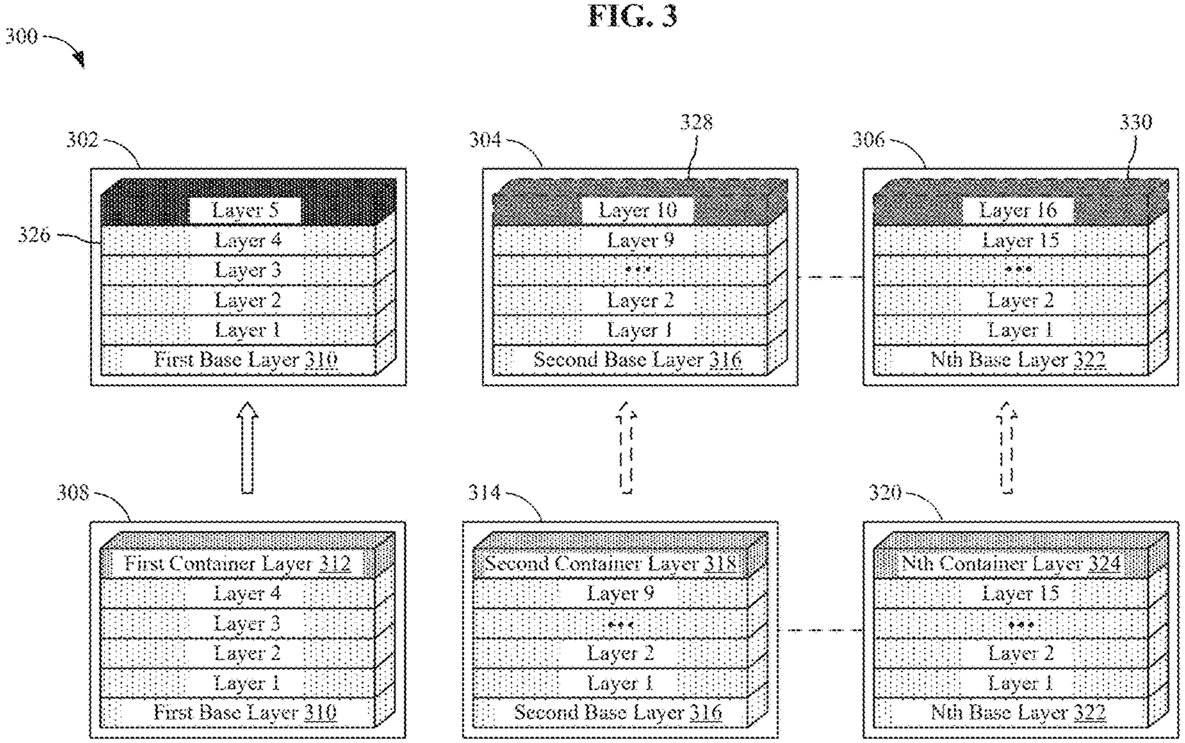
FIG. 3 is a diagram that illustrates a pictorial depiction of the synchronization of the data layers in the container images, in accordance with an embodiment of the disclosure.

FIG. 3 is a diagram that illustrates a pictorial depiction of the synchronization of the data layers in the container images, in accordance with an embodiment of the disclosure. FIG. 3 is explained in conjunction with elements from FIG. 1, and FIG. 2. With reference to FIG. 3, the pictorial depiction represents a multi-repository architecture 300 (also called as architecture 300) designed to manage and distribute security patches across multiple container images. The architecture includes a first repository 302, a second repository 304, up to Nth repository 306. In an embodiment of the disclosure, each of the first repository 302, the second repository 304, up to the Nth repository 306 includes a container image. Further, the architecture also includes a first container 308 including a first base layer 310 that serves as a foundation for the first container 308, and layer 1 to layer 4. The layer 1 to layer 4 of the first container 308 represent additional application-specific layers that are built upon the base layer, providing functionalities and dependencies. Further, the first container 308 includes a first container layer 312 that encapsulates the previous layers, and any runtime configurations associated with the first container 308.

Further, the architecture also includes a second container 314 including a second base layer 316 similar to the first base layer 310 associated with the first container 308. The second container 314 includes layer 1 to layer 9, and a second container layer 318. The layer 1 to layer 9 provide extensive functionalities used in the application. For example, the extensive functionalities may include core application logic, user interface components, data management functionality, and the like. Further, the second container layer 318 integrates the prior layers associated with the second container 314. The architecture also includes an Nth container 320 including a Nth base layer 322 that functions as the foundational layer for the Nth container 320. The Nth container 320 also includes layer 1 to layer 15, which include various components used for the application's operation. Furthermore, the Nth container 320 includes an Nth container layer 324 that integrates the prior layers associated with the Nth container 320.

Furthermore, the first repository 302 includes a first container image 326 including a set of first elements of the first container 308, such as the first base layer 310 and the layer 1 to the layer 4. The first repository 302 also includes an additional layer e.g., a layer 5. The layer 5 incorporates a critical security patch designed to address a high-severity Common Vulnerability and Exposure (CVE). Further, the second repository 304 includes a second container image 328 including a set of second elements of the second container 314, such as the second base layer 316 and the layer 1 to the layer 9. The second repository 304 also includes an additional layer e.g., a layer 10. In an embodiment of the disclosure, the layer 10 is the target data layer, which is currently vacant and created to receive updates for security patches. Furthermore, the Nth repository 306 includes an Nth container image 330 including a set of third elements of the Nth container 320, such as the Nth base layer 322 and the layer 1 to the layer 15. The Nth repository 306 also includes an additional layer e.g., a layer 16. In an embodiment of the disclosure, the layer 16 is the target data layer, which is currently vacant and created to receive updates for security patches.

In the context of software deployment, timely delivery of security patches is crucial, particularly when addressing vulnerabilities classified as high severity, such as the high severity CVE. The challenge arises when a security patch, developed for one container image, is to be propagated to over 100 additional images across multiple repositories within a limited timeframe. The traditional patch management lifecycle, which includes packaging, testing, and delivery, can lead to significant delays, leaving numerous container images vulnerable to exploitation during the update process. The system 202 streamlines the patch delivery process by leveraging a structured approach to security updates. The system 202 begins with the packaging of the security fix into layer 5 of the first image within the first repository 302. After undergoing a comprehensive lifecycle of packaging, testing, and delivery, the security patch/security patch is successfully integrated into the first repository 302.

To address the need for rapid distribution of the same security patch to multiple images, the system 202 is designed to utilize the vacant target data layers (layer 10 in the second container image 328 and layer 16 in the Nth container image 330) to implement the security fixes. This allows the system 202 to deploy the same security patch across various container images without the need for extensive modifications to existing layers. By implementing this architecture, the system 202 ensures that security patches can be swiftly delivered to affected container images, significantly reducing the vulnerability window and enhancing the overall security posture of the applications. This patch management strategy not only improves responsiveness to security threats but also minimizes disruption in the operational environment, allowing the efficient patch management to be used for maintaining the integrity and security of containerized applications across diverse repositories.

Since multiple container images share the same underlying infrastructure, the system 202 optimizes resource utilization and reduces the need for redundant hardware, leading to a smaller physical footprint and cost-effective scalability. Additionally, the lightweight nature of containers compared to traditional virtual machines allows for better memory management, as they share the same operating system kernel, thereby resulting in reduced memory overhead. This dynamic allocation of resources is used for performing real-time updates through target data layers, improving the overall performance of the system 202 and reducing latency during data operations. The lightweight nature of containers refers to their small size and efficient resource utilization compared to traditional virtual machines. Containers package only the application and its dependencies, without the need for a full operating system, as required by virtual machines. This makes the containers smaller in size and efficient in their use of system resources, such as memory and CPU. In contrast to traditional computing systems, which often face challenges with timely patch management due to sequential update processes, the architecture of the system 202 allows rapid and efficient distribution of security patches. By leveraging parallel processing capabilities, the system 202 allows for simultaneous updates across multiple container images, minimizing downtime and enhancing security response times. Furthermore, the cost efficiency and operational agility of the system 202 significantly outperform traditional environments, which typically require extensive reconfiguration and longer wait times for updates. Overall, this multi-repository approach not only streamlines security management but also supports the integrity and security of containerized applications.

Figure 4:
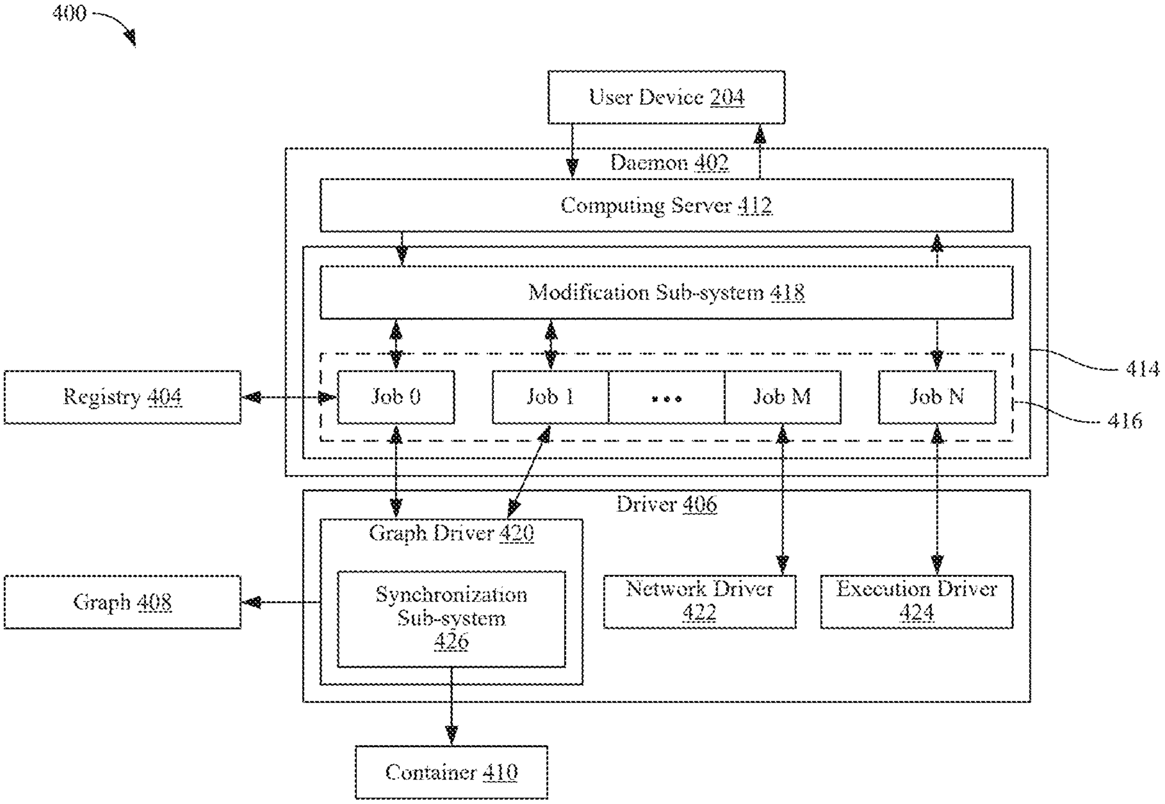
FIG. 4 is a diagram that illustrates a system-level architecture of a system for the synchronization of the data layers in the container images, in accordance with an embodiment of the disclosure.

FIG. 4 is a diagram that illustrates a system-level architecture 400 of the system 202 for the synchronization of the data layers in the container images, in accordance with an embodiment of the disclosure. FIG. 4 is explained in conjunction with elements from FIG. 1, FIG. 2, and FIG. 3. As shown in FIG. 4, the system-level architecture 400 includes the user device 204, a daemon 402, a registry 404, a driver 406, a graph 408, and a container 410.

In an embodiment of the disclosure, the system receives the command using the user device 204 (For example, push <image-name>:<tag> shared layer <image-name>:<tag>) to initiate the synchronization of container images. For example, a command push <image-name>:<tag> shared layer <image-name>:<tag> introduces a new functionality in docker for managing shared data layers (e.g., the at least one source data layer) between container images. The daemon 402 is a core service running on a host machine that manages containers. Further, the daemon 402 includes a set of components, such as a computing server 412 (similar to the computing server 210 of FIG. 2) and a computing engine 414. The computing engine 414 includes a set of jobs 416 (Job 0 to Job N), and a modification sub-system 418. The computing server 412 acts as the interface for processing the command from the user device 204. In an embodiment of the disclosure, the modification sub-system 418 is a component of the system 202. The modification sub-system 418 is configured to receive the command from the user via the user device 204. The modification sub-system 418 detects the source data layer in the source repository 206 and determines the source manifest information associated with the source container image 216. In an embodiment of the disclosure, the source manifest information is a detailed description of the data layers of the source container image 216, configurations of the source container image 216, and metadata of the source container image 216. The modification sub-system 418 also generates the target manifest field for the target container image 218, facilitating synchronization of the at least one source data layer. In an embodiment of the disclosure, the target manifest field includes one or more references to the at least one source data layer of the source container image 216. Furthermore, the set of jobs 416 represents tasks or processes managed by the computing engine 414. The set of jobs 416 interacts with the modification sub-system 418 to execute one or more tasks associated with the synchronization. In an embodiment of the disclosure, the computing engine 414 is communicatively coupled with the registry 404 (such as the source repository 206 or target repository of FIG. 2). The registry 404 is a storage location for the container images. The registry 404 interacts with the computing engine 414 to store and retrieve the container images. Details on the command have been explained with reference to at least FIG. 5. Further, details on the modification sub-system 418 have been explained with reference to at least FIG. 6, FIG. 8, and FIG. 9A.

Further, the driver 406 is a component that manages low-level operations of the container 410. The driver 406 includes a graph driver 420, a network driver 422, and an execution driver 424. The graph driver 420 includes a synchronization sub-system 426. In an embodiment of the disclosure, the synchronization sub-system 426 is a component of the system 202. The synchronization sub-system 426 is configured to manage the synchronization of the at least one source data layer with the target data layer based on the target manifest field. Further, the synchronization sub-system 426 ensures that the correct data layers (e.g., the at least one source data layer) are integrated into the container 410. The synchronization sub-system 426 ensures that the correct data layers are integrated into the container 410 by facilitating the synchronization process between the at least one source data layer and the target data layer. Further, the synchronization sub-system 426 uses the target manifest field, which includes the one or more references to the at least one source data layer to perform the synchronization process. The synchronization sub-system 426 verifies the integrity and availability of the at least one source data layer in the source repository, ensuring the at least one source data layer is accessible and correct. Once verified, the synchronization sub-system 426 extracts the source layer content from the at least one source data layer and incorporates the source layer content into the target data layer, effectively updating the target container image with the latest data. This process is crucial for maintaining the accuracy and functionality of the containerized application. Details on the process of integrating the at least one source data layer with the target data layer using the synchronization sub-system 426 have been explained with reference to at least FIG. 9B.

Further, the network driver 422 manages network configurations for the container 410, ensuring that the container 410 is able to communicate with external networks. Further, the execution driver 424 manages the execution environment for the container 410, managing how the container 410 runs on the host system. In an embodiment of the disclosure, the graph driver 420 is communicatively coupled with the graph 408 and the container 410. The graph 408 interacts with the graph driver 420 to manage the storage and retrieval of the data layers, ensuring efficient data handling. Further, the container 410 stores the updated container image to be deployed and run. Efficient data handling is achieved through the graph driver 420, which manages the storage and retrieval of data layers by organizing them in a structured manner, allowing for quick access and minimizing data redundancy. This interaction between the graph driver 420 and the graph 408 ensures that data layers are efficiently stored, retrieved, and updated as needed for the container 410. Details on the synchronization sub-system 426 have been explained with reference to at least FIG. 9B.

Figure 5:
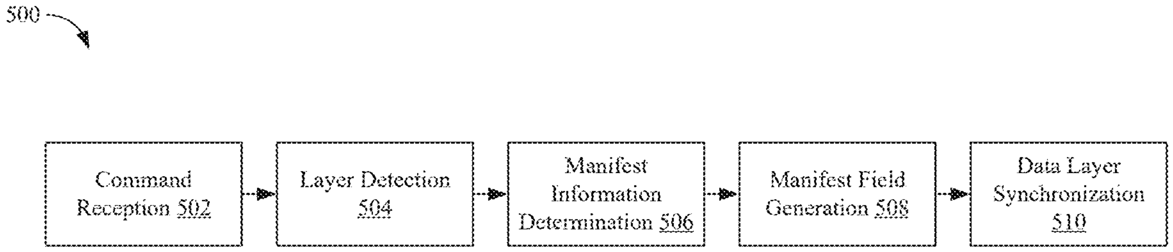
FIG. 5 is a diagram that illustrates exemplary operations of the system for the synchronization of the data layers in the container images, in accordance with an embodiment of the disclosure.

FIG. 5 is a diagram that illustrates exemplary operations of the system 202 for the synchronization of the data layers in the container images, in accordance with an embodiment of the disclosure. FIG. 5 is explained in conjunction with elements from FIG. 1, FIG. 2, FIG. 3, and FIG. 4. With reference to FIG. 5, there is shown a block diagram 500 that illustrates exemplary operations from 502 to 510, as described herein. The exemplary operations illustrated in the block diagram 500 start at 502 and are performed by any computing system, apparatus, or device, such as by the computer 102 of FIG. 1 or system 202 of FIG. 2. Although illustrated with discrete blocks, the exemplary operations associated with one or more blocks of the block diagram 500 are divided into additional blocks, combined into fewer blocks, or eliminated, depending on the particular implementation.

At 502, a command reception operation is executed. In the command reception operation, the system 202 is configured to receive the command for synchronizing the at least one source data layer of the source container image 216 with the target data layer of the target container image 218. In an embodiment of the disclosure, the command initiates the synchronization process, specifying which data layers are to be synchronized. For example, the syntax of the command may be push <image-name>:<tag> shared layer <image-name>:<tag>. The command introduces a new functionality in docker for managing shared data layers (e.g., the at least one source data layer) between container images. In an embodiment of the disclosure, the <image-name> is the name of a container image, and <tag> is a specific version or variant of the container image. In an embodiment of the disclosure, the two instances of <image-name> signify that the command may obtain the shared layer from the source container image 216 and integrate it into the target data layer.

At 504, a layer detection operation is executed. In the layer detection operation, the system 202 is configured to detect the at least one source data layer associated with the source container image 216 in the source repository 206. In an embodiment of the disclosure, the at least one source data layer is detected based on the command.

For detecting the at least one source data layer, the system 202 is configured to extract a set of keywords from the command. For example, the set of keywords may include at least one of a name of the source container image 216, a name of the target container image 218, an address of the source repository 206, an address of the target repository 208, a version of the source container image 216, a version of the target container image 218, or the like. Further, the system 202 is configured to detect the source container image 216 in the source repository 206 based on the set of keywords. Furthermore, the system 202 is configured to detect the at least one source data layer in the source repository 206 based on the set of keywords and the detection of the source container image 216. In an embodiment of the disclosure, the set of keywords extracted from the command is used for the synchronization process by providing identifiers that allow the system 202 to locate the source container image 216 and the target container image 218 along with the source repository 206, the target repository 208, and the at least one source data layer. This structured approach ensures that the synchronization is carried out efficiently and accurately.

At 506, a manifest information determination operation is executed. In the manifest information determination operation, the system 202 is configured to determine the source manifest information associated with the source container image 216 based on the detection of the at least one source data layer in the source repository 206. For example, the source manifest information includes a structure of the at least one source data layer and a set of characteristics of the at least one source data layer. The structure of the source container image 216 is composed of multiple components that work together to define how the source container image 216 is built and functions. For example, the source container image 216 is made up of multiple source data layers, each source data layer representing specific changes or additions, such as the operating system and application code. Further, the set of characteristics of the source container image 216 defines the properties and functionalities of the source container image 216. For example, the properties and functionalities of the source container image 216 include a size of the source container image 216 indicating the total storage space of the source container image 216, which can impact deployment speed and resource utilization of the source container image 216.

At 508, a manifest field generation operation is executed. In the manifest field generation operation, the system 202 is configured to generate the target manifest field associated with the target manifest information of the target container image 218. In an embodiment of the disclosure, the target manifest field is generated using the modification sub-system 418 based on the source manifest information. The modification sub-system 418 of the system 202 performs operation 502, operation 504, operation 506, and operation 508 to generate the target manifest field. In an embodiment of the disclosure, the target manifest field corresponds to a specific component or section within the target manifest information that is generated for the target container image 218. The target manifest field is generated to encapsulate information related to the at least one source data layer. For example, the target manifest field includes one or more references to the at least one source data layer. Details on the generation of the target manifest field have been explained with reference to at least FIG. 7.

For the generation of the target manifest field, the system 202 is configured to detect an availability of source layer content associated with the at least one source data layer in the source repository 206. In an embodiment of the disclosure, the availability of the source layer content in the source repository 206 is detected based on the source manifest information. In an embodiment of the disclosure, the source layer content corresponds to data or files associated with the at least one source data layer in the source container image 216. For example, the source layer content includes application binaries associated with the at least one source data layer, libraries associated with the at least one source data layer, configuration files associated with the at least one source data layer, or multiple resources associated with the at least one source data layer used for the operation of the source container image 216.

Further, the system 202 is configured to obtain one or more source attributes associated with the at least one source data layer based on the source manifest information and the detection of the availability of the source layer content. In an embodiment of the disclosure, the one or more source attributes correspond to metadata associated with the at least one source data layer of the source container image 216. For example, the one or more source attributes include at least one of a digest of the at least one source data layer, a differential number of the at least one source data layer, a name of the at least one source data layer, a version of the at least one source data layer, and the like. The system 202 is configured to generate the target manifest field for the target data layer based on the one or more source attributes. In an embodiment of the disclosure, a set of target data layers of the target container image 218 includes the target data layer. The system 202 is configured to store the target manifest field in the target repository 208. In an embodiment of the disclosure, the target manifest information includes a configuration of each target data layer of the set of target data layers and one or more characteristics associated with each target data layer of the set of target data layers.

The configuration of each target data layer of the set of target data layers corresponds to specific settings and parameters that dictate how the configuration of each target data layer of the set of target data layers operates within the target container image 218. For example, the configuration of each target data layer of the set of target data layers includes environment variables, commands to execute the target container image 218, port mappings for network access, and volume mounts for data persistence. Further, the characteristics associated with each target data layer of the set of target data layers correspond to attributes or properties that describe the set of target data layers in the target container image 218. For example, the characteristics may include a size of the set of target data layers, a version of the set of target data layers, a digest of the set of target data layers, and a base image of the set of target data layers.

At 510, a data layer synchronization operation is executed. In the data layer synchronization operation, the system 202 is configured to synchronize the at least one source data layer with the target data layer based on the target manifest field. For the synchronization of the at least one source data layer with the target data layer, the system 202 is configured to obtain the target manifest field from the target repository 208. Further, the system 202 is configured to extract the one or more source attributes from the obtained target manifest field. The system 202 is configured to obtain the at least one source data layer from the source repository 206 based on the extracted one or more source attributes. Furthermore, the system 202 is configured to extract the source layer content from the obtained at least one source data layer. The system 202 is configured to integrate the extracted source layer content into the target data layer.

Figure 6:
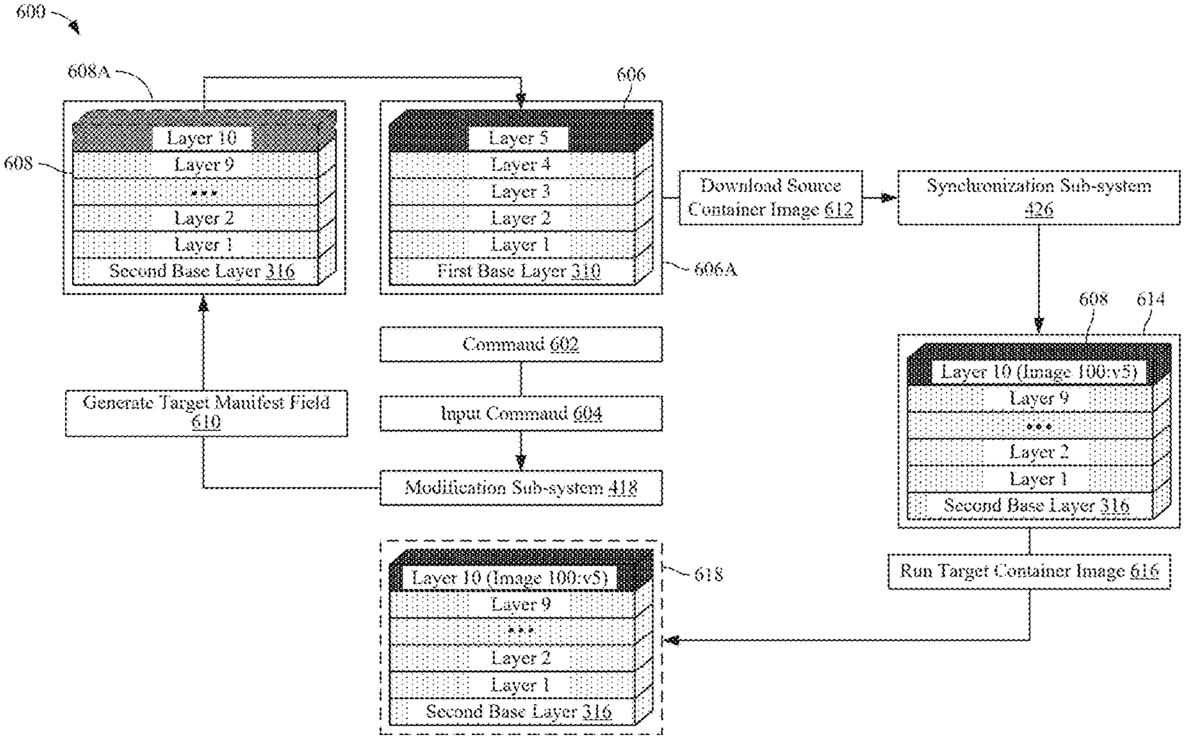
FIG. 6 is a diagram that illustrates exemplary operations of a modification sub-system of the system and a synchronization sub-system of the system for the synchronization of the data layers in the container images, in accordance with an embodiment of the disclosure.

FIG. 6 is a diagram 600 that illustrates exemplary operations of a modification sub-system 418 of the system 202 and a synchronization sub-system 426 of the system 202 for the synchronization of the data layers in the container images, in accordance with an embodiment of the disclosure. FIG. 6 is explained in conjunction with elements from FIG. 1, FIG. 2, FIG. 3, FIG. 4, and FIG. 5.

As shown in the diagram 600 of FIG. 6, the system 202 receives the command 602 via the user device 204, at operation 604. For example, the command 602 is "push Image200:v10 shared layer Image100:v5". The command 602 indicates that the Image100:v5 (depicted as the source container image 606) includes the at least one source data layer to be synchronized with the target data layer of an Image200:v10 (depicted as the target container image 608), optimizing the process by reusing the source layer content associated with the at least one source data layer. The source container image 606 is stored in the source repository 606A and the target container image 608 is stored in the target repository 608A.

In an embodiment of the disclosure, a layer 5 of the source container image 606 incorporates a critical security patch designed to address the high-severity CVE. Further, a layer 10 of the target container image 608 is currently vacant and prepared to receive updates for security patches. The source container image 606 and the target container image 608 of FIG. 6 are similar to that of the first container image 326 and the second container image of FIG. 2, respectively. For the sake of brevity, the source container image 606 and the target container image 608 have not been explained in detail.

Further, the modification sub-system 418 receives the command 602 and detects the at least one source data layer associated with the source container image 606 in the source repository 606A. The at least one source data layer is detected based on the command 602 by parsing the command 602. By parsing the command 602, the modification sub-system 418 determines the source container image (Image100:v5) and the target container image (Image200:v10). The system 202 uses this information to detect the at least one source data layer associated with the Image100:v5 container that can be synchronized with the target container image. Further, the modification sub-system 418 is configured to determine the source manifest information associated with the source container image 606 based on the detection of the at least one source data layer in the source repository 606A. The modification sub-system 418 is further configured to generate the target manifest field based on the source manifest information, at operation 610. The target manifest field is associated with the target manifest information of the target container image 608. In an embodiment of the disclosure, the generated target manifest field is stored in the target container image 608 located in the target repository 608A. The generated target manifest field stored in the target container image 608 includes one or more references to the source container image 606. Accordingly, the source container image 606 is downloaded based on the generated target manifest field, at operation 612. The operation 612 ensures that the at least one source data layer is available for integration with the target data layer.

Furthermore, the synchronization sub-system 426 is configured to synchronize the at least one source data layer with the target data layer of the target container image 608 based on the target manifest field. The synchronization process involves incorporating the at least one source data layer, such as the Layer 5 from the source container image 606, into the target data layer of the target container image 608. Further, a graph 614 associated with the target container image 608 is updated to reflect an updated target container image 608, showing the inclusion of the at least one source data layer (e.g., layer 10 (Image100:v5)). Once the synchronization process is complete, the system 202 runs the updated target container image 608, at operation 616. In an embodiment of the disclosure, a container 618 associated with the target container image 608 includes the data layers including the at least one sourced data layers, ensuring it operates with the latest configurations and data layers. This process updates and synchronizes container images by using the at least one source data layer, optimizing resource usage and deployment speed of the system 202.

Figure 7:
FIG. 7 is a diagram that illustrates a pictorial depiction for the generation of a target manifest field, in accordance with an embodiment of the disclosure.

FIG. 7 is a diagram that illustrates a pictorial depiction 700 of the generation of the target manifest field, in accordance with an embodiment of the disclosure. FIG. 7 is explained in conjunction with elements from FIG. 1, FIG. 2, FIG. 3, FIG. 4, FIG. 5, and FIG. 6. In an embodiment of the disclosure, the modification sub-system 418 generates the target manifest field.

As shown in the pictorial depiction 700, the process of generation of the target manifest field is triggered by issuing the command e.g., push Image200:v10 shared layer Image100:v5. Upon receiving the command, the modification sub-system 418 parses the command to identify the target container image (e.g., image200:v10), and the source container image (e.g., image100:v5). The modification sub-system 418 further queries the registry to obtain the source manifest information 704 for the at least one source data layer. The obtained source manifest information 704 includes information of the at least one source data layer, such as the differential number of the at least one source data layer, the name of the at least one source data layer, the version of the at least one source data layer, and the like. The obtained source manifest information 704 ensures that the at least one source data layer exists and is accessible in the source repository. Further, the modification sub-system 418 generates the target manifest field 702 for the target container image, which includes details, such as the layer digest, size, and configuration information of the target container image. The target manifest field 702 is added to the target manifest information 706. In an embodiment of the disclosure, a new attribute called remote_shared_layer is added to the target manifest field 702 indicating the at least one source data layer. After integrating the new attribute into the target manifest information 706, the modification sub-system 418 finalizes the updated manifest, confirming the accuracy of attributes. Furthermore, the modification sub-system 418 executes the push operation to upload the target manifest field 702 and any associated layers to a repository. The modification sub-system 418 also verifies the success of the uploading of the target manifest field 702 to ensure that the updated target container image has the one or more references from the at least one source data layer.

Figure 8:
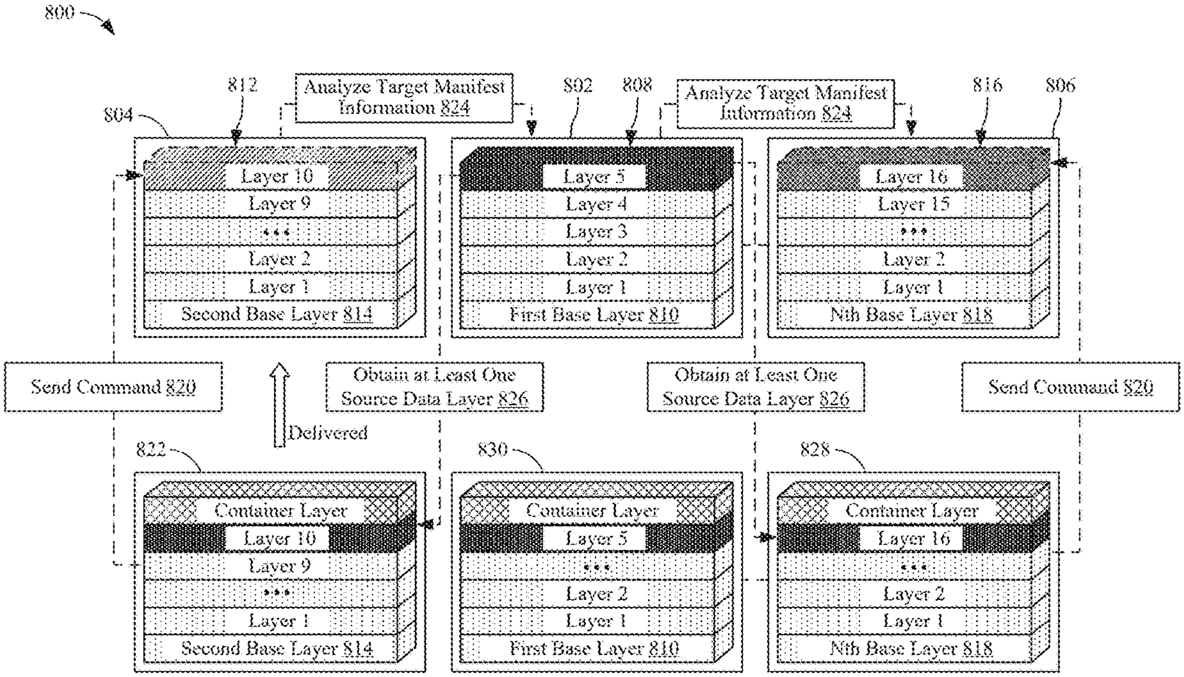
FIG. 8 is a diagram that illustrates exemplary operations of the modification sub-system for the synchronization of the data layers in the container images, in accordance with an embodiment of the disclosure.

FIG. 8 is a diagram that illustrates exemplary operations of the modification sub-system 418 for the synchronization of the data layers in the container images, in accordance with an embodiment of the disclosure. FIG. 8 is explained in conjunction with elements from FIG. 1, FIG. 2, FIG. 3, FIG. 4, FIG. 5, FIG. 6, and FIG. 7.

With reference to the diagram of FIG. 8, the pictorial depiction represents a multi-repository architecture 800 (also called architecture 800) designed to perform operations of the modification sub-system 418 of the system 202 for the synchronization of the data layers in the container images. The architecture includes a first repository 802, a second repository 804, up to Nth repository 806. The first repository 802, the second repository 804, up to the Nth repository 806 may be similar to the first repository 302, the second repository 304, up to the Nth repository 306 of FIG. 3. In an embodiment of the disclosure, each of the first repository 802, the second repository 804, up to the Nth repository 806 includes a container image. The first repository 802 includes a first container image 808 including a first base layer 810 that serves as a foundation for the first repository 802, and layer 1 to layer 4. The layer 1 to layer 4 of the first repository 802 represent additional application-specific layers that are built upon the first base layer 810, providing functionalities and dependencies. Further, the first container image 808 also includes an additional layer e.g., a layer 5. The layer 5 incorporates a critical security patch designed to address the high-severity CVE.

Further, the second repository 804 includes a second container image 812 including a second base layer 814 and layer 1 to layer 9. The second container image 812 also includes an additional layer e.g., a layer 10. In an embodiment of the disclosure, the layer 10 is the target data layer, which is currently vacant and prepared to receive updates for security patches. Furthermore, the Nth repository 806 includes an Nth container image 816 including a Nth base layer 818 and the layer 1 to the layer 15. The Nth container image 816 also includes an additional layer e.g., a layer 16. In an embodiment of the disclosure, the layer 16 is the target data layer, which is currently vacant and prepared to receive updates for security patches.

At operation 820, the synchronization sub-system 426 is configured to send a command, from a second container 822, to the second repository 804 for obtaining Layer 10 from the second repository 804. For example, the command may be "pull Image200:v10 or pull Image200".

Further, at operation 824, the synchronization sub-system 426 analyses the target manifest information of the second container image 812 (e.g., Image200:v10) for any remote_shared_layer attributes. The synchronization sub-system 426 identifies that layer 5 is the at least one source data layer stored in the first repository 802 based on the target manifest information.

At operation 826, the synchronization sub-system 426 obtains layer 5 from the first container image's (e.g., image100's) repository e.g., the first repository 802. Further, the source layer content of layer 5 is then integrated into the second container 822 and an Nth container 828 completing the synchronization process. The operation 820, operation 824, and operation 826 ensure that the second container 822 and the Nth container 828 incorporate the at least one source data layer from the first repository 802.

Upon the completion of the synchronization process, a first container 830 includes a set of first elements of a first repository 802, such as the base layer and the layer 1 to the layer 5. Further, the second container 822 includes a set of second elements of the second repository 804, such as the base layer and the layer 1 to the layer 10. Furthermore, the Nth container 828 includes a set of third elements of the Nth repository 806, such as the base layer and the layer 1 to the layer 16.

In an embodiment of the disclosure, the synchronization sub-system 426 again performs operation 820, operation 824, and operation 826 for integrating the source layer content stored in the layer 5 with the target data layer 16. For the sake of brevity, operation 820, operation 824, and operation 826 are not explained in detail.

Figure 9A:
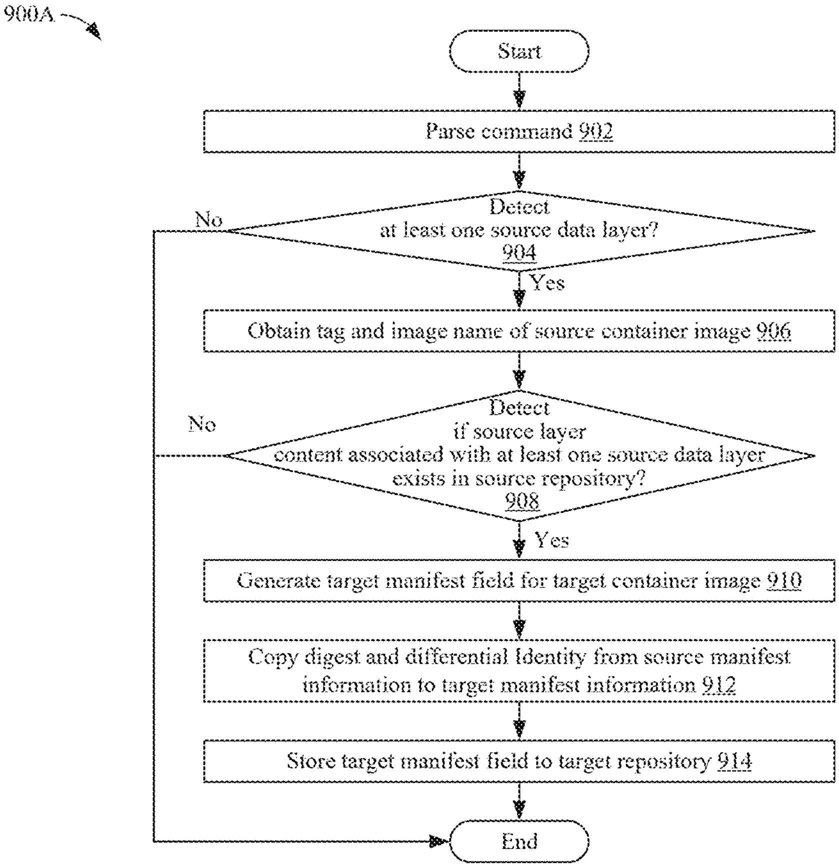
FIG. 9A is a diagram that illustrates a flowchart of a first method for the modification sub-system, in accordance with an embodiment of the disclosure.
Figure 9B:
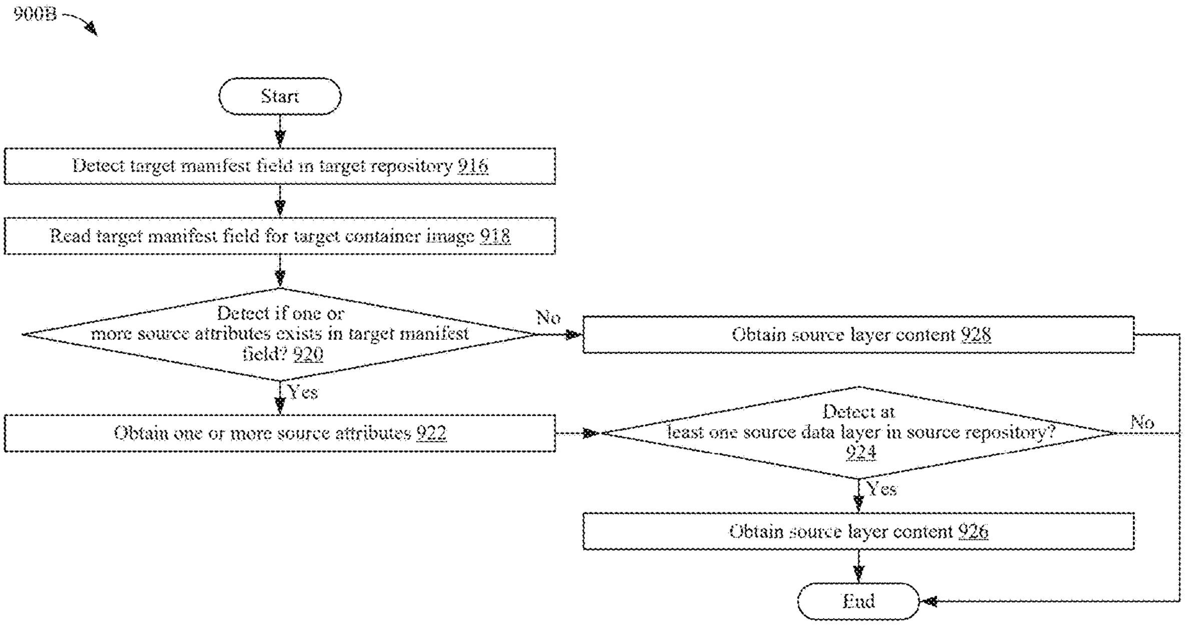
FIG. 9B is a diagram that illustrates a flowchart of a second method for the synchronization sub-system, in accordance with an embodiment of the disclosure.

FIG. 9A is a diagram that illustrates a flowchart of a first method 900A for the modification sub-system 418, in accordance with an embodiment of the disclosure. Further, FIG. 9B is a diagram that illustrates a flowchart of a second method 900B for the synchronization sub-system 426, in accordance with an embodiment of the disclosure. For the sake of brevity, FIG. 9A and FIG. 9B are explained together. FIG. 9A and FIG. 9B are explained in conjunction with elements from FIG. 1, FIG. 2, FIG. 3, FIG. 4, FIG. 5, FIG. 6, FIG. 7, and FIG. 8.

At 902, the command received by the system 202 is parsed. In an embodiment of the disclosure, the modification sub-system 418 of the system 202 parses the command received by the system 202. For parsing the command, the modification sub-system 418 of the system 202 analyzes and interprets the command. For example, the system 202 receives the command, such as push Image200:L10 shared layer Image100:L5. The command indicates that the user wants to push Image100's Layer 5 (e.g., the at least one source data layer of the source container image) with Layer 10 of Image200 (e.g., the target data layer of the target container image). The details on the command have been explained with reference to at least FIG. 5.

At 904, the at least one source data layer is detected in a first repository 802. In an embodiment of the disclosure, the modification sub-system 418 of the system 202 detects the at least one source data layer in the first repository 802 using the tag and image name of the source container image, e.g., Image100:L5. If the at least one source data layer exists, the process moves to 906. If the at least one source data layer does not exist, the process ends. The details on the detection of the at least one source data layer have been explained with reference to at least FIG. 5 and FIG. 6.

At 906, the tag and the image name of the source container image are obtained. In an embodiment of the disclosure, the modification sub-system 418 of the system 202 obtains the tag and the image name of the source container image. In an embodiment of the disclosure, the modification sub-system 418 of the system 202 detects the source manifest information for the at least one source data layer using the <image-name>:<tag>, such as Image100:v5. The details on the detection of the source manifest information have been explained with reference to at least FIG. 5 and FIG. 6.

At 908, it is detected if the source layer content associated with the at least one source data layer exists in the source repository. In an embodiment of the disclosure, the modification sub-system 418 of the system 202 detects if the source layer content associated with the at least one source data layer exists in the source repository. If the source layer content exists in the source repository, the process moves to 910. If the source layer content does not exist in the source repository, the process ends.

At 910, the target manifest field is generated for the target container image. In an embodiment of the disclosure, the modification sub-system 418 of the system 202 generates the target manifest field for the target container image, e.g., Image200_L10. For example, the target manifest field (e.g., new attribute remote_shared_layer) is updated with the value <image-name>:<tag>, e.g., Image 100: L5. The details on the generation of the target manifest field have been explained with reference to at least FIG. 5.

At 912, the digest and the differential Identity (ID) from the at least one source data layer's source manifest information are copied to the target manifest information. In an embodiment of the disclosure, the modification sub-system 418 of the system 202 copies the digest and the differential Identity (ID) from the at least one source data layer's source manifest information to the target manifest information.

At 914, the target manifest field associated with the target data layer is stored in the target repository. In an embodiment of the disclosure, the modification sub-system 418 of the system 202 stores the target manifest field associated with the target data layer in the target repository.

At 916, the target manifest field is detected in the target repository. In an embodiment of the disclosure, the synchronization sub-system 426 of the system 202 detects the target manifest field in the target repository for identifying the one or more source attributes associated with the at least one source data layer using <image-name>:<tag>. The details on the detection of the target manifest field in the target repository have been explained with reference to at least FIG. 5.

At 918, the detected target manifest field is read from the target repository for the target container image. In an embodiment of the disclosure, the synchronization sub-system 426 of the system 202 reads the target manifest field for the target container image (E.g., Image200:L10).

At 920, it is detected if the one or more source attributes exist in the target manifest field. In an embodiment of the disclosure, the synchronization sub-system 426 of the system 202 detects if the one or more source attributes (e.g., remote_shared_layer attribute) exist in the target manifest field. If the one or more source attributes exist in the target manifest field, the process moves to 922. Further, if the one or more source attributes do not exist in the target manifest field, the process moves to 928.

If the one or more source attributes exist in the target manifest field, the one or more source attributes are obtained, at 922. In an embodiment of the disclosure, the synchronization sub-system 426 of the system 202 obtains the one or more source attributes. For example, the one or more source attributes correspond to <image-name>: <tag>associated with the at least one source data layer, e.g., Image100:L5. The details on the one or more source attributes have been explained with reference to at least FIG. 5.

At 924, the at least one source data layer is detected in the source repository. In an embodiment of the disclosure, the synchronization sub-system 426 of the system 202 detects the at least one source data layer in the source repository to confirm the existence of the at least one source data layer. If the at least one source data layer exists in the source repository, the process moves to 926. Further, if the at least one source data layer does not exist in the source repository, the process ends. The details on the detection of the at least one source data layer have been explained with reference to at least FIG. 5 and FIG. 6.

At 926, the source layer content is obtained from the at least one source data layer. In an embodiment of the disclosure, the synchronization sub-system 426 of the system 202 obtains the source layer content from the at least one source data layer (e.g., Image100:L5) from the source repository. Further, the process ends after obtaining the source layer content. The details on obtaining the source layer content have been explained with reference to at least FIG. 5.

At 928, the source layer content is again obtained from the at least one source data layer. In an embodiment of the disclosure, the synchronization sub-system 426 again obtains the source layer content from the at least one source data layer upon detecting that the one or more source attributes do not exist in the target manifest field. Further, the process ends after obtaining the source layer content. The details on obtaining the source layer content have been explained with reference to at least FIG. 5.

The operation of FIG. 9A and FIG. 9B outlines the detailed process of handling the command for pushing the at least one source data layer, ensuring that checks and actions are performed to maintain consistency in container management.

Figure 10:
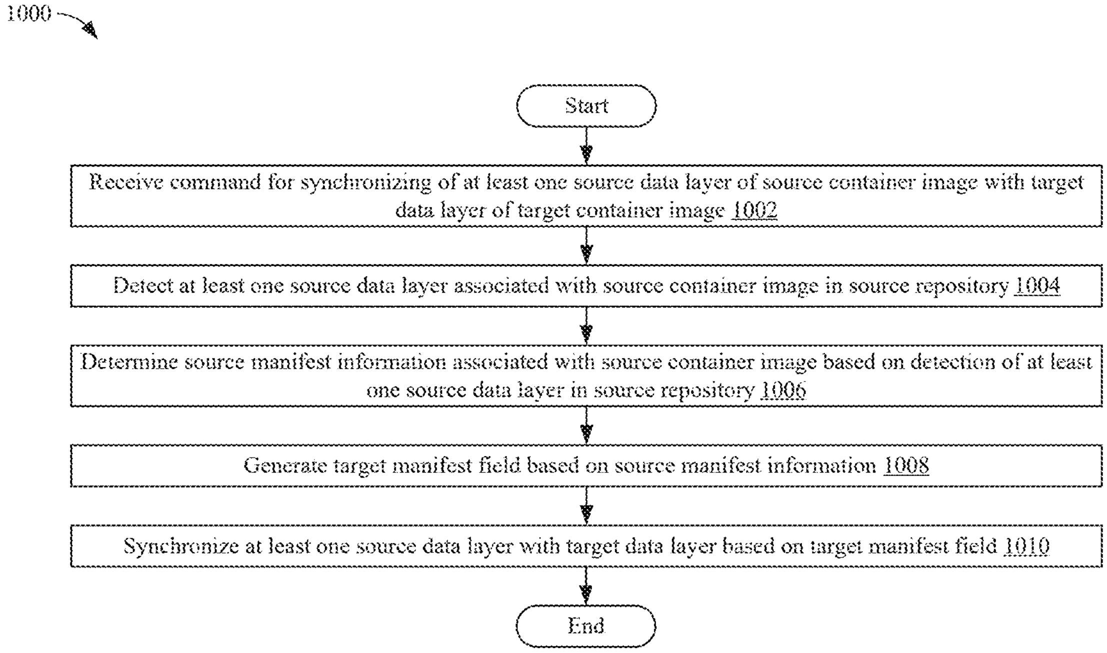
FIG. 10 is a diagram that illustrates a first flowchart of a method for the synchronization of the data layers in the container images, in accordance with an embodiment of the disclosure.

FIG. 10 is a diagram that illustrates a first flowchart of a method for the synchronization of data layers in container images, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, FIG. 9A, and FIG. 9B. The operations of the exemplary computer-implemented method are executed by any computing system, for example, by the computer 102 of FIG. 1 or the system 202 of FIG. 2. The operations of the first flowchart 1000 may start at 1002.

At 1002, a command for synchronizing at least one source data layer of a source container image with a target data layer of a target container image is received. In an embodiment of the disclosure, the system 202 is configured to synchronize the at least one source data layer of the source container image with the target data layer of the target container image. In an embodiment of the disclosure, the source container image is a starting point from which the at least one source data layer may be extracted and synchronized with the target data layer of the target container image. The target container image is a destination container image that may receive the at least one source data layer from the source container image. Further, the at least one source data layer corresponds to one or more individual data layers within the source container image that contain specific data or functionality to be synchronized with the target data layer. Details about the reception of the command are provided, for example, in FIG. 5.

At 1004, the at least one source data layer associated with the source container image is detected in a source repository 206. In an embodiment of the disclosure, the system 202 is configured to detect the at least one source data layer associated with the source container image in the source repository 206. In an embodiment of the disclosure, the at least one source data layer is detected based on the command. Details about the detection of the source data layer are provided, for example, in FIG. 5, FIG. 6, FIG. 8, and FIG. 9A.

At 1006, source manifest information associated with the source container image is determined based on the detection of the at least one source data layer in the source repository 206. In an embodiment of the disclosure, the system 202 is configured to determine the source manifest information associated with the source container image based on the detection of the at least one source data layer in the source repository 206. For example, the source manifest information includes a structure of the at least one source data layer and a set of characteristics of the at least one source data layer. Details about the determination of the source manifest information are provided, for example, in FIG. 5, FIG. 6, FIG. 8, and FIG. 9A.

At 1008, a target manifest field is generated based on the source manifest information. In an embodiment of the disclosure, the system 202 is configured to generate the target manifest field based on the source manifest information. In an embodiment of the disclosure, the target manifest field is associated with target manifest information of the target container image. In an embodiment of the disclosure, the target manifest field includes one or more references to the at least one source data layer. For example, the target manifest information includes a configuration of each target data layer of a set of target data layers associated with the target container image and one or more characteristics associated with each target data layer of the set of target data layers. Details about the generation of the target manifest field are provided, for example, in FIG. 5, FIG. 6, FIG. 7, FIG. 8, and FIG. 9A.

At 1010, the at least one source data layer is synchronized with the target data layer based on the target manifest field. In an embodiment of the disclosure, the system 202 is configured to synchronize the at least one source data layer with the target data layer based on the target manifest field. Details about the synchronization of the at least one source data layer with the target data layer are provided, for example, in FIG. 5 and FIG. 9B.

While the above operation shown in FIG. 10 is described in a particular sequence, the operation may occur in variations to the sequence in accordance with various embodiments of the disclosure. Further, details related to the operation of FIG. 10, which are already covered in the description related to FIG. 1 to FIG. 9B are not discussed again in detail here for the sake of brevity.

Figure 11:
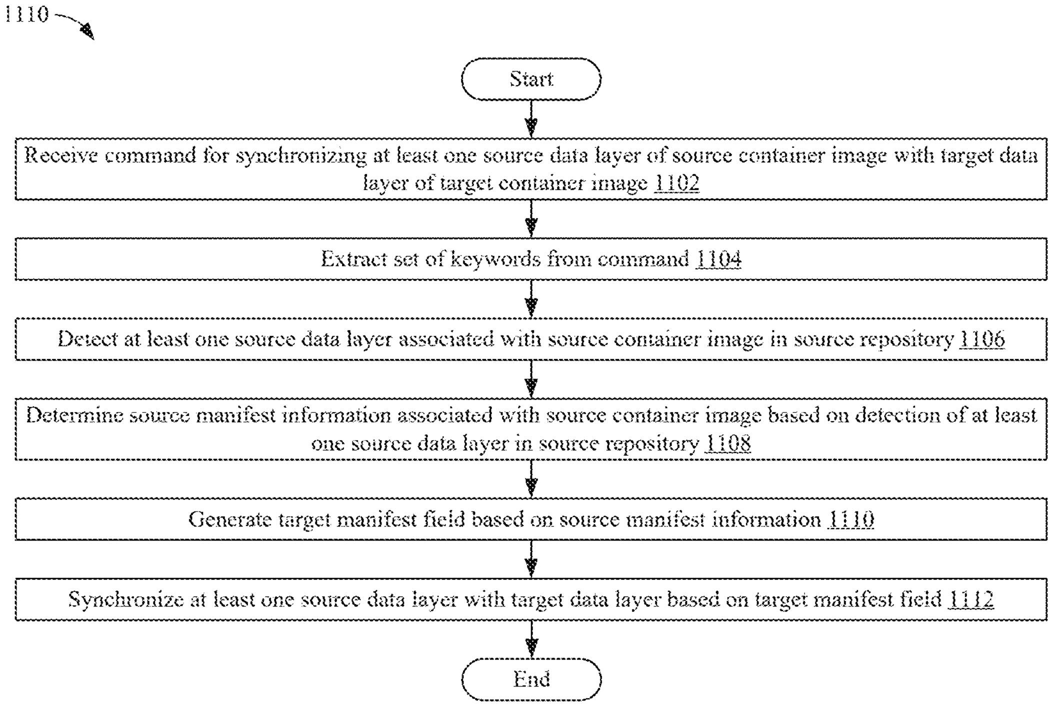
FIG. 11 is a diagram that illustrates a second flowchart of a method for the synchronization of the data layers in the container images, in accordance with an embodiment of the disclosure.

FIG. 11 is a diagram that illustrates a second flowchart of a method for the synchronization of the data layers in the container images, in accordance with an embodiment of the disclosure. FIG. 11 is explained in conjunction with elements from FIG. 1, FIG. 2, FIG. 3, FIG. 4, FIG. 5, FIG. 6, FIG. 7, FIG. 8, FIG. 9A, FIG. 9B, and FIG. 10. The operations of the exemplary computer-implemented method are executed by any computing system, for example, by the computer 102 of FIG. 1 or the system 202 of FIG. 2. The operations of the second flowchart 1100 may start at 1102.

At 1102, a command for synchronizing at least one source data layer of a source container image with a target data layer of a target container image is received. In an embodiment of the disclosure, the system 202 is configured to synchronize the at least one source data layer of the source container image with the target data layer of the target container image. Details about the reception of the command are provided, for example, in FIG. 5 and FIG. 10.

At 1104, a set of keywords is extracted from the command. In an embodiment of the disclosure, the system 202 is configured to extract the set of keywords from the command. In an embodiment of the disclosure, the set of keywords includes at least one of a name of the source container image, a name of the target container image, an address of a source repository 206 of the source container image, a version of the target container image, a version of the source container image, or the like. Details about the extraction of the set of keywords are provided, for example, in FIG. 5.

At 1106, the at least one source data layer associated with the source container image is detected in a source repository 206. In an embodiment of the disclosure, the system 202 is configured to detect the at least one source data layer associated with the source container image in the source repository 206. In an embodiment of the disclosure, the at least one source data layer is detected based on the set of keywords. For the detection of the at least one source data layer, the method includes detecting the source container image in the source repository based on the set of keywords. Further, the method includes detecting the at least one source data layer in the source repository based on the set of keywords and the detection of the source container image. Details about the detection of the source data layer are provided, for example, in FIG. 5, FIG. 6, FIG. 8, and FIG. 9A.

At 1108, source manifest information associated with the source container image is determined based on the detection of the at least one source data layer in the source repository 206. In an embodiment of the disclosure, the system 202 is configured to determine the source manifest information associated with the source container image based on the detection of the at least one source data layer in the source repository 206. For example, the source manifest information includes a structure of the at least one source data layer and a set of characteristics of the at least one source data layer. Details about the determination of the source manifest information are provided, for example, in FIG. 5, FIG. 6, FIG. 8, and FIG. 9A.

At 1110, a target manifest field is generated based on the source manifest information. In an embodiment of the disclosure, the system 202 is configured to generate the target manifest field based on the source manifest information. In an embodiment of the disclosure, the target manifest field is associated with target manifest information of the target container image. In an embodiment of the disclosure, the target manifest field includes one or more references to the at least one source data layer. For example, the target manifest information includes a configuration of each target data layer of a set of target data layers associated with the target container image and one or more characteristics associated with each target data layer of the set of target data layers. Details about the generation of the target manifest field are provided, for example, in FIG. 5, FIG. 6, FIG. 7, FIG. 8, and FIG. 9A.

For the generation of the target manifest field, the method includes detecting an availability of source layer content associated with the at least one source data layer in the source repository. The availability of the source layer content in the source repository is detected based on the source manifest information. The method includes obtaining one or more source attributes associated with the at least one source data layer based on the source manifest information and the detection of the availability of the source layer content. The one or more source attributes correspond to metadata associated with the at least one source data layer of the source container image. Further, the method includes generating the target manifest field for the target data layer based on the one or more source attributes. In an embodiment of the disclosure, a set of target data layers of the target container image includes the target data layer. The method also includes storing the target manifest field in a target repository.

At 1112, the at least one source data layer is synchronized with the target data layer based on the target manifest field. In an embodiment of the disclosure, the system 202 is configured to synchronize the at least one source data layer with the target data layer based on the target manifest field. For the synchronization of the at least one source data layer, the method includes obtaining the target manifest field from the target repository. The method includes extracting the one or more source attributes from the obtained target manifest field. Further, the method includes obtaining the at least one source data layer from the source repository based on the extracted one or more source attributes. The method also includes extracting the source layer content from the obtained at least one source data layer. The method includes integrating the extracted source layer content into the target data layer. Details about the synchronization of the at least one source data layer with the target data layer are provided, for example, in FIG. 5 and FIG. 9B.

While the above operation shown in FIG. 11 is described in a particular sequence, the operation may occur in variations to the sequence in accordance with various embodiments of the disclosure. Further, details related to various operation of FIG. 11, which are already covered in the description related to FIG. 1 to FIG. 10 are not discussed again in detail here for the sake of brevity.

The system 202 presents multiple advantages, such as enhancement in hardware efficiency by allowing multiple container images to share the same data layers, particularly those that contain patches for vulnerabilities. By reducing the need for redundant storage of identical layers across different images, the system 202 minimizes the overall disk space requirements. This efficient use of hardware resources can lead to cost savings and improved performance, as less physical storage space is needed, and the system 202 can operate more smoothly with fewer read/write operations.

From a processing perspective, the ability to synchronize and share data layers across multiple container images streamlines the update process. When a data layer is updated with a patch for the CVE, the system 202 can be quickly propagated to relevant container images without the need for each container image to be rebuilt from scratch. This reduces the computational overhead associated with managing multiple versions of similar container images, allowing for faster deployment and updates. Consequently, developers can focus on enhancing application features rather than spending excessive time on maintenance. In terms of memory management, the system 202 allows for better utilization of memory of the system 202. By sharing layers with each other, the system 202 may load only the data associated with a specific data layer into memory, reducing the memory footprint of running containers. This is particularly beneficial in environments with limited resources, as it allows for more containers to run simultaneously without overwhelming the memory capacity of the system 202.

Further, the ability of the system 202 to deliver data layers with the same patches across multiple container images results in rapid responses to high-severity vulnerabilities. This capability ensures that emergent patches for critical vulnerabilities can be made available quickly, significantly reducing the window of exposure for applications. Organizations can maintain a more secure environment with less downtime and fewer disruptions. Both developers and users benefit from simplified maintenance and upgrades. The system 202 allows for easy updates without the need for extensive testing or consideration of potential negative impacts from patches. This ease of use encourages regular updates, which is used for maintaining security and performance in containerized applications.

Furthermore, the system 202 is compatible with current container tools. This compatibility ensures that organizations can adopt this technology without needing to overhaul their existing workflows or retrain their teams extensively. This results in a smoother transition to more efficient container management practices, allowing users to leverage the benefits of the system 202 while continuing to use familiar tools.

Various embodiments of the disclosure may provide a computer program product for synchronizing at least one source data layer of a source container image with a target data layer of a target container image is described. The computer program product includes one or more computer-readable storage medium and program instructions stored on the one or more computer-readable storage media to perform operations. The operations include receiving a command for the synchronizing of the at least one source data layer of the source container image with the target data layer of the target container image. The operations further include detecting the at least one source data layer associated with the source container image in the source repository 206. The at least one source data layer is detected based on the command. Further, the operations include determining source manifest information associated with the source container image based on the detection of the at least one source data layer in the source repository 206. The operations further include generating a target manifest field based on the source manifest information. The target manifest field is associated with target manifest information of the target container image. The target manifest field includes one or more references to the at least one source data layer. The operations further include synchronizing the at least one source data layer with the target data layer based on the target manifest field.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a computer, a command for synchronizing at least one source data layer of a source container image with a target data layer of a target container image;

detecting, by the computer, the at least one source data layer of the source container image in a source repository, wherein the at least one source data layer is detected based on the command;

determining, by the computer, source manifest information associated with the source container image based on the detection of the at least one source data layer in the source repository;

generating, by the computer, a target manifest field based on the source manifest information, wherein the target manifest field is associated with target manifest information of the target container image, the target manifest field comprises a new attribute that comprises one or more references to the at least one source data layer, the target manifest field corresponds to the target data layer, and the target data layer is an additional layer that is vacant to receive source layer content from the at least one source data layer; and synchronizing, by the computer, the at least one source data layer with the target data layer based on the target manifest field.

2. The computer-implemented method of claim 1, further comprising:

extracting, by the computer, a set of keywords from the command;

detecting, by the computer, the source container image in the source repository based on the set of keywords; and detecting, by the computer, the at least one source data layer in the source repository based on the set of keywords and the detection of the source container image.

3. The computer-implemented method of claim 2, wherein the set of keywords is selected from the group consisting of a name of the source container image, a name of the target container image, an address of the source repository, a version of the target container image, and a version of the source container image.

4. The computer-implemented method of claim 1, further comprising:

detecting, by the computer, an availability of the source layer content associated with the at least one source data layer in the source repository based on the source manifest information;

obtaining, by the computer, one or more source attributes associated with the at least one source data layer based on the source manifest information and the detection of the availability of the source layer content, wherein the one or more source attributes correspond to metadata associated with the at least one source data layer of the source container image;

generating, by the computer, the target manifest field for the target data layer based on the one or more source attributes; and storing, by the computer, the target manifest field in a target repository.

5. The computer-implemented method of claim 4, further comprising:

obtaining, by the computer, the target manifest field from the target repository;

extracting, by the computer, the one or more source attributes from the obtained target manifest field;

obtaining, by the computer, the at least one source data layer from the source repository based on the extracted one or more source attributes;

extracting, by the computer, the source layer content from the obtained at least one source data layer; and integrating, by the computer, the extracted source layer content into the target data layer.

6. The computer-implemented method of claim 5, wherein the one or more source attributes are selected from the group consisting of a digest of the at least one source data layer, a differential number of the at least one source data layer, a name of the at least one source data layer, and a version of the at least one source data layer.

7. The computer-implemented method of claim 4, wherein a set of target data layers of the target container image comprises the target data layer, and the target manifest information comprises a configuration of each target data layer of the set of target data layers and one or more characteristics associated with each target data layer of the set of target data layers.

8. The computer-implemented method of claim 1, wherein the source manifest information comprises a structure of the at least one source data layer and a set of characteristics of the at least one source data layer.

9. A computer system, comprising:

a processor set;

one or more computer-readable storage media; and program instructions stored on the one or more computer-readable storage media, the program instructions executable by the processor set to cause the processor set to:

receive a command to synchronize at least one source data layer of a source container image with a target data layer of a target container image;

extract a set of keywords from the command, wherein the set of keywords is selected from the group consisting of a name of the source container image, a name of the target container image, an address of a source repository of the source container image, a version of the target container image, and a version of the source container image;

detect the at least one source data layer of the source container image in the source repository, wherein the at least one source data layer is detected based on the set of keywords;

determine source manifest information associated with the source container image based on the detection of the at least one source data layer in the source repository;

generate a target manifest field based on the source manifest information, wherein the target manifest field is associated with target manifest information of the target container image, the target manifest field comprises a new attribute that comprises one or more references to the at least one source data layer, the target manifest field corresponds to the target data layer, and the target data layer is an additional layer that is vacant to receive source layer content from the at least one source data layer; and synchronize the at least one source data layer with the target data layer based on the target manifest field.

10. The computer system of claim 9, wherein the program instructions further cause the processor set to:

detect the source container image in the source repository based on the set of keywords; and detect the at least one source data layer in the source repository based on the set of keywords and the detection of the source container image.

11. The computer system of claim 9, wherein the program instructions further cause the processor set to:

detect an availability of the source layer content associated with the at least one source data layer in the source repository, based on the source manifest information;

obtain one or more source attributes associated with the at least one source data layer based on the source manifest information and the detection of the availability of the source layer content, wherein the one or more source attributes correspond to metadata associated with the at least one source data layer of the source container image;

generate the target manifest field for the target data layer based on the one or more source attributes; and store the target manifest field in a target repository.

12. The computer system of claim 11, wherein the program instructions further cause the processor set to:

obtain the target manifest field from the target repository;

extract the one or more source attributes from the obtained target manifest field;

obtain the at least one source data layer from the source repository based on the extracted one or more source attributes;

extract the source layer content from the obtained at least one source data layer; and integrate the extracted source layer content into the target data layer.

13. The computer system of claim 12, wherein the one or more source attributes are selected from the group consisting of a digest of the at least one source data layer, a differential number of the at least one source data layer, a name of the at least one source data layer, and a version of the at least one source data layer.

14. The computer system of claim 11, wherein a set of target data layers of the target container image comprises the target data layer, and the target manifest information comprises a configuration of each target data layer of the set of target data layers and one or more characteristics associated with each target data layer of the set of target data layers.

15. The computer system of claim 9, wherein the source manifest information comprises a structure of the at least one source data layer and a set of characteristics of the at least one source data layer.

16. A computer program product for synchronizing at least one source data layer of a source container image with a target data layer of a target container image, the computer program product comprising:

one or more computer-readable storage media; and program instructions stored on the one or more computer-readable storage media to perform operations, the operations comprising:

receiving a command for the synchronizing of the at least one source data layer of the source container image with the target data layer of the target container image;

detecting the at least one source data layer of the source container image in a source repository, wherein the at least one source data layer is detected based on the command;

determining source manifest information associated with the source container image based on the detection of the at least one source data layer in the source repository;

generating a target manifest field based on the source manifest information, wherein the target manifest field is associated with target manifest information of the target container image, the target manifest field comprises a new attribute that comprises one or more references to the at least one source data layer, the target manifest field corresponds to the target data layer, and the target data layer is an additional layer that is vacant to receive source layer content from the at least one source data layer; and synchronizing the at least one source data layer with the target data layer based on the target manifest field.

17. The computer program product of claim 16, wherein the program instructions stored on the one or more computer-readable storage media perform the operations further comprising:

extracting a set of keywords from the command;

detecting the source container image in the source repository based on the set of keywords; and detecting the at least one source data layer in the source repository based on the set of keywords and the detection of the source container image.

18. The computer program product of claim 17, wherein the set of keywords is selected from the group consisting of a name of the source container image, a name of the target container image, an address of the source repository, a version of the target container image, and a version of the source container image.

19. The computer program product of claim 16, wherein the program instructions stored on the one or more computer-readable storage media perform the operations further comprising:

detecting an availability of the source layer content associated with the at least one source data layer in the source repository based on the source manifest information;

obtaining one or more source attributes associated with the at least one source data layer based on the source manifest information and the detection of the availability of the source layer content, wherein the one or more source attributes correspond to metadata associated with the at least one source data layer of the source container image;

generating the target manifest field for the target data layer based on the one or more source attributes; and storing the target manifest field in a target repository.

20. The computer program product of claim 19, wherein the program instructions stored on the one or more computer-readable storage media perform the operations further comprising:

obtaining the target manifest field from the target repository;

extracting the one or more source attributes from the obtained target manifest field;

obtaining the at least one source data layer from the source repository based on the extracted one or more source attributes;

extracting the source layer content from the obtained at least one source data layer; and integrating the extracted source layer content into the target data layer.

* * * * *